United States Patent
Chatting et al.

(10) Patent No.: US 7,982,762 B2
(45) Date of Patent: Jul. 19, 2011

(54) SYSTEM AND METHOD FOR COMBINING LOCAL AND REMOTE IMAGES SUCH THAT IMAGES OF PARTICIPANTS APPEAR OVERLAID ON ANOTHER IN SUBSTANIAL ALIGNMENT

(75) Inventors: David J Chatting, Suffolk (GB); Jeremy M Thorne, Suffolk (GB); David G Morrison, Suffolk (GB)

(73) Assignee: British Telecommunications public limited company, London (GB)

( * ) Notice: Subject to any disclaimer, the term of this patent is extended or adjusted under 35 U.S.C. 154(b) by 1255 days.

(21) Appl. No.: 10/571,066

(22) PCT Filed: Aug. 27, 2004

(86) PCT No.: PCT/GB2004/003695
§ 371 (c)(1), (2), (4) Date: Mar. 8, 2006

(87) PCT Pub. No.: WO2005/025219
PCT Pub. Date: Mar. 17, 2005

(65) Prior Publication Data
US 2007/0064112 A1    Mar. 22, 2007

(30) Foreign Application Priority Data
Sep. 9, 2003   (GB) .................................. 0321083.8

(51) Int. Cl.
*H04N 7/14* (2006.01)
*H04N 5/228* (2006.01)
*G06K 9/46* (2006.01)
*G06K 9/66* (2006.01)

(52) U.S. Cl. ................. 348/14.07; 348/14.08; 348/14.1; 348/14.16; 348/222.1; 382/190

(58) Field of Classification Search .... 348/14.01–14.16; 382/263–269
See application file for complete search history.

(56) References Cited

U.S. PATENT DOCUMENTS
5,481,297 A * 1/1996 Cash et al. ................. 348/14.12
(Continued)

FOREIGN PATENT DOCUMENTS
GB         2155729 A       9/1985
(Continued)

OTHER PUBLICATIONS
International Search Report.
(Continued)

*Primary Examiner* — Lin Ye
*Assistant Examiner* — Chia-Wei A Chen
(74) *Attorney, Agent, or Firm* — Nixon & Vanderhye P.C.

(57) ABSTRACT

The invention provides a method and system wherein first video images are directly overlaid with remote video images to produce a combined video image which is then displayed to the user and/or stored as appropriate. Preferably at least one of the first and/or remote images is subject to an image processing operation prior to the overlay operation being performed, the image processing operation being such that the scenes contained within the images to be overlaid when processed are separably distinguishable to a user within the combined video image when viewed by the user. The overlay operation is performed such that the scenes contained within the respective video images are substantially in alignment on top of each other. By overlaying the respective first and remote video images as described a single image is obtained within which the respective scenes of the respective first and remote images are still separably distinguishable, but which is still of an appropriate size for display on a screen of limited size without occlusion of one or other of the images.

29 Claims, 19 Drawing Sheets

U.S. PATENT DOCUMENTS

| | | | |
|---|---|---|---|
| 5,500,671 A * | 3/1996 | Andersson et al. | 348/14.1 |
| 5,886,735 A * | 3/1999 | Bullister | 348/14.16 |
| 5,936,610 A | 8/1999 | Endo | |
| 5,978,518 A * | 11/1999 | Oliyide et al. | 382/260 |
| 6,272,231 B1 * | 8/2001 | Maurer et al. | 382/103 |
| 6,567,128 B1 * | 5/2003 | Webb et al. | 348/584 |
| 7,190,388 B2 * | 3/2007 | Lafon et al. | 348/14.01 |
| 7,206,029 B2 * | 4/2007 | Cohen-Solal | 348/565 |
| 7,277,117 B2 * | 10/2007 | Takashima et al. | 348/14.09 |
| 7,443,447 B2 * | 10/2008 | Shirakawa | 348/376 |
| 2001/0033324 A1 * | 10/2001 | Sukeno et al. | 348/14.01 |

FOREIGN PATENT DOCUMENTS

| | | |
|---|---|---|
| GB | 2176671 A | 12/1986 |
| JP | 4-175086 | 6/1992 |
| WO | WO 99/34600 | 7/1999 |

OTHER PUBLICATIONS

GB Search Report dated Mar. 1, 2004.
Cullinan et al., "Reflexion—a Responsive Virtual Mirror for Interpersonal Communication", http://www.medialabeurope.org/-stefan/hc/projects/reflexion/ Feb. 27, 2004.
Vicki Bruce, Extract from "In the Eye on One Beholder", 19998, 1$^{st}$ Edition, ISBN:0-19852439-0, pp. 67-69.
Technical Report, "Low-Bitrate Watercolour Video", MSR-TR-2002-88 Microsoft Research Document.
Yu et al., "Microsoft Portrait: A Real-Time Mobile Video Communication. System", Microsoft Research, Asia.
Li et al., "Bi-Level Video: Video Communication at Very Low Bit Rates", Microsoft Research, China, Jul. 15, 2003, http://www.acm.org/sigs/sigmm/MM2001/ep/li/, circa. 2003.
Cullinan et al., "Reflexion: a Responsive Virtual Mirror", Media Lab Europe, Sep. 2003.

* cited by examiner

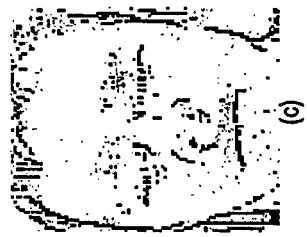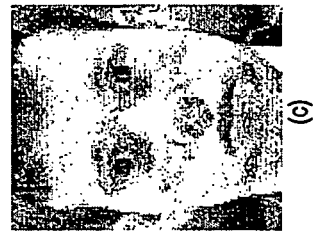
=  =  =
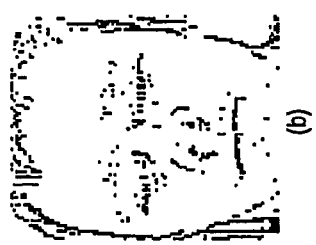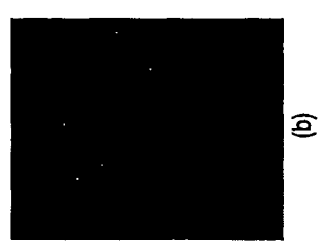
FIGURE 18   FIGURE 19   FIGURE 20
+  +  +
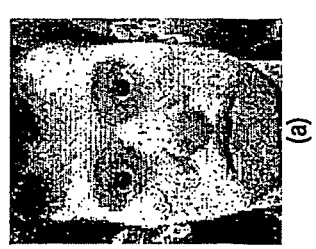

SYSTEM AND METHOD FOR COMBINING LOCAL AND REMOTE IMAGES SUCH THAT IMAGES OF PARTICIPANTS APPEAR OVERLAID ON ANOTHER IN SUBSTANIAL ALIGNMENT

This application is the US national phase of international application PCT/GB2004/003695 filed 27 Aug. 2004 which designated the U.S. and claims benefit of GB 0321083.86, dated 9 Sep. 2003, the entire content of which is hereby incorporated by reference.

TECHNICAL FIELD

The invention relates to a method and system for video communications, and in particular to video communications where local and remote images are viewable by a user simultaneously.

BACKGROUND TO THE INVENTION AND PRIOR ART

The concept of video communications is long known in the art, and is on the verge of becoming mainstream with the advent of UMTS mobile handsets, capable of transmitting and receiving video streams. An example of such a service publicly available in the UK is that of the "Three™" service offered by Hutchison 3G UK Ltd. Additionally, other videoconferencing services are also well-known in the art, such as those provided over the Internet using a software application such as Microsoft® Netmeeting® running on a general purpose computer system equipped with a camera and a network connection, or by using dedicated video-conferencing hardware.

It is common within video communications systems to provide a video image not only of the remote particpant(s) to the video conference or video call, but also of the local participant(s). Such visual feedback allows the local participant to see how the remote party sees them and to see how the video-conferencing system is representing them. Additionally the visual feedback also enables the user to position themselves within the camera's view and ensure their face is well lit and visible.

Several examples of visual feedback systems for video communications are known in the art, as are shown in FIGS. 1, and 2. More particularly, FIG. 1 illustrates a common arrangement for visual feedback wherein a display screen 1 is divided into a remote display portion 2, and a local display portion 3. The remote display portion 2 displays the incoming video signal received from the remote user (usually via a network of some form), whereas the local display portion 3 displays a video image of the local user as captured by the local terminal's image capturing means such as a camera or the like. Examples of such an arrangement known in the art are those used by both Hutchison 3G UK Ltd in the "Three" service, and by Microsoft Corp in the NetMeeting software application.

Alternative forms of visual feedback are also known in the art which do not divide the display screen 2 into portions, but which combine the local images and the remote images into a combined image, such that the remote user(s) and the local user(s) are displayed side by side on a common background. An example of such a system is the "Reflexion" system developed by Media Lab Europe, and described at http://www.medialabeurope.org/~stefan/hc/projects/reflexion/. Several screen shots of the Reflexion system are shown in FIG. 2.

A Reflexion station consists of a camera and video display connected to a computer. Each participant, of which there can be several, uses a separate Reflexion station. Using a segmentation algorithm, the computer extracts an image of the participant from his background and transmits a mirror image of it over the network to the other stations. The computer also receives extracted participant images from the other stations and combines them all together into a single video scene. The effect is one of a "digital mirror" in which the participant sees a reflection of himself as well as the reflections of the other remotely-located participants.

The system automatically monitors auditory cues and uses them to compose the scene in a way that enhances the interaction. For example, the current prototype tracks which participants are speaking in order to judge who is the "centre of attention". Active participants are rendered opaque and in the foreground to emphasise their visual presence, while other less-active participants appear slightly faded in the background in a manner that maintains awareness of their state without drawing undue attention. The system smoothly transitions the layering and appearance of the participants as their interactions continue. Every participant sees exactly the same composition, enhancing the sense of inhabiting a "shared space".

Whether the visual feedback image is displayed in a separate portion of the display as is the case of the "Three" and NetMeeting systems, or as an integrated composite image as is the case in the Reflexions system, a common requirement is that the screen be large enough to display both images simultaneously without significant overlap. In cases where the screen is not large enough to display both images in their entirety, the visual feedback portion of the display may partially occlude the remote display portion of the display, as is common with the "Three" system. Where the screen is usually large enough to display both images, the images are usually depicted side-by-side or one on top of the other without significant overlap of the images of the users, as is the case with the NetMeeting and Reflexions systems. This may present further disadvantages in that the arrangement requires that the user attention in terms of eye gaze and/or head orientation be deliberately shifted from the visual feedback image to the remote image and vice versa, and especially where there is some distance between the two images.

SUMMARY OF THE INVENTION

The invention provides a method and system which provides an alternative arrangement of the display of the visual feedback signal with respect to the remote video, which is particularly, but not exclusively, useful for use with small display screens where there is not enough space to display the local and remote signals side by side or otherwise without at least partial occlusion of one of the images, or without the images being so small as to lose detail. In particular the invention provides a method and system wherein the local video images are directly overlaid with the remote video images to produce a combined video image which is then displayed to the user and/or stored as appropriate. Preferably at least one of the local and/or remote images is subject to an image processing operation prior to the overlay operation being performed, the image processing operation being such that the scenes contained within the images to be overlaid when processed are separably distinguishable to a user within the combined video image when viewed by the user. Additionally, the image processing operations may be further arranged such that one of the resulting local or remote images after processing draws less attention from the user than the other. Preferably although not exclusively the local image should draw less attention than the remote image. The overlay operation is performed such that the scenes contained within the respective video images are substantially in alignment on top of each other. By overlaying the respective local and remote video images as described a single composite image is obtained within which the respective scenes of the respective local and remote images are still separably distinguishable, but which is still of an appropriate size for display on a screen of limited size without occlusion of one or other of the images.

In view of the above, from a first aspect of the invention there is provided a video communications system comprising:
  a) video imaging means arranged to produce first video images representative of a first scene;
  b) communications means arranged to send information relating to said first video images and to receive information relating to second video images representative of a second scene, preferably via a network; and
  c) a video display means arranged to display video images to a user;
  said system being characterised by further comprising:
  d) image generating means arranged to generate overlay video images for display by combining respective first and second scenes of respective first and second video images such that they appear to be overlaid in substantial alignment.

Such an arrangement provides many of the advantages set out above.

In a preferred embodiment the system further comprises:
image processing means arranged to process said first video images and/or said second video images according to one or more respective image processing operations, and to output processed versions of the first and second video images to the image generating means as input thereto;
wherein said image processing operations are operable to process said video images such that the respective scenes of the first and second video images are separably distinguishable in the overlay image generated by the image generating means.

By "separably distinguishable" it is meant that the processing operations applied are such that the primary features of the two respective scenes are each distinguishable to the user within the resulting overlay image.

The image generating means may be located within the user terminals themselves, or in alternative embodiments may be located within a sidetone server with which each terminal communicates. In such alternative embodiments each user terminal transmits its local images to the sidetone server, where the images are respectively combined to produce the overlay images, which are then sent onwards to the other user terminal for display. Such an arrangement has the advantage that the processing to produce the overlay images is performed at the sidetone server, thus reducing user terminal complexity and power requirements, as each user terminal does not need to perform the image processing operations required to produce the overlay images.

From a second aspect, the invention further provides a video communications method comprising the steps of:
  a) producing first video images representative of a first scene;
  b) sending information relating to said first video images and receiving information relating to second video images representative of a second scene, preferably via a network; and
  c) displaying video images to a user;
  said method being characterised by further comprising:
  d) generating overlay video images for display by combining respective first and second scenes of respective first and second video images such that they appear overlaid in substantial alignment.

Additionally from a third aspect the present invention also provides a computer program or suite of programs arranged such that when executed on a computer system the program or suite of programs causes the computer system to perform the method of the second aspect. Moreover, from a further aspect there is also provided a computer readable storage medium storing a computer program or suite of programs according to the third aspect. The computer readable storage medium may be any suitable data storage device or medium known in the art, such as, as a non-limiting example, any of a magnetic disk, DVD, solid state memory, optical disc, magneto-optical disc, or the like.

BRIEF DESCRIPTION OF THE DRAWINGS

Further features and advantages of the present invention will become apparent from the following description of embodiments thereof, presented by way of example only, and with reference to the accompanying drawings, wherein like reference numerals refer to like parts, and wherein:

FIGS. 18(a), (b), and (c) is a diagram illustrating a first method by which processed images may be combined to produce a resultant overlay image;

FIGS. 19(a), (b), and (c) is a diagram illustrating a second method by which processed images may be combined to produce a resultant overlay image;

FIGS. 20(a), (b), and (c) is a diagram illustrating a third method by which images may be combined to produce a resultant overlay image.

DESCRIPTION OF THE EMBODIMENTS

A description of several embodiments of the present invention will now be undertaken. These embodiments are should be considered as non-limiting examples, and it should be apparent to the intended reader from the description of these embodiments that further embodiments could also be provided by taking the various elements of the described embodiments (and in particular the image processing operations employed) and combining them in different combinations to produce the function of the present invention, each of which additional embodiments are also intended to fall within the ambit thereof.

In the introductory portion of the description, we referred to the local image of the user which is displayed to that user as the visual feedback signal. Within the specific description to be given herein, however, we refer to the visual feed back signal as a "visual sidetone" signal, the terminology being analogous to the audio sidetone signal which has been used within telephony systems for many years. Therefore, within the following description the terms "visual sidetone signal" and "visual feedback signal" are synonymous and interchangeable.

Prior to the specific description of each of the embodiments to be described, some common elements of each of the embodiments will be described, of which each embodiment may make use. More particularly, a description of the apparatus elements required by each embodiment will be undertaken, followed by a description of various image processing operations which each embodiment may use. It should be pointed out that there are several alternative image processing operations which may be used by any particular embodiment, and hence each of these image processing operations will first be described separately, and then within each respective description of each embodiment it will be indicated as to which of the image processing operations is particularly used thereby.

Figure 3:
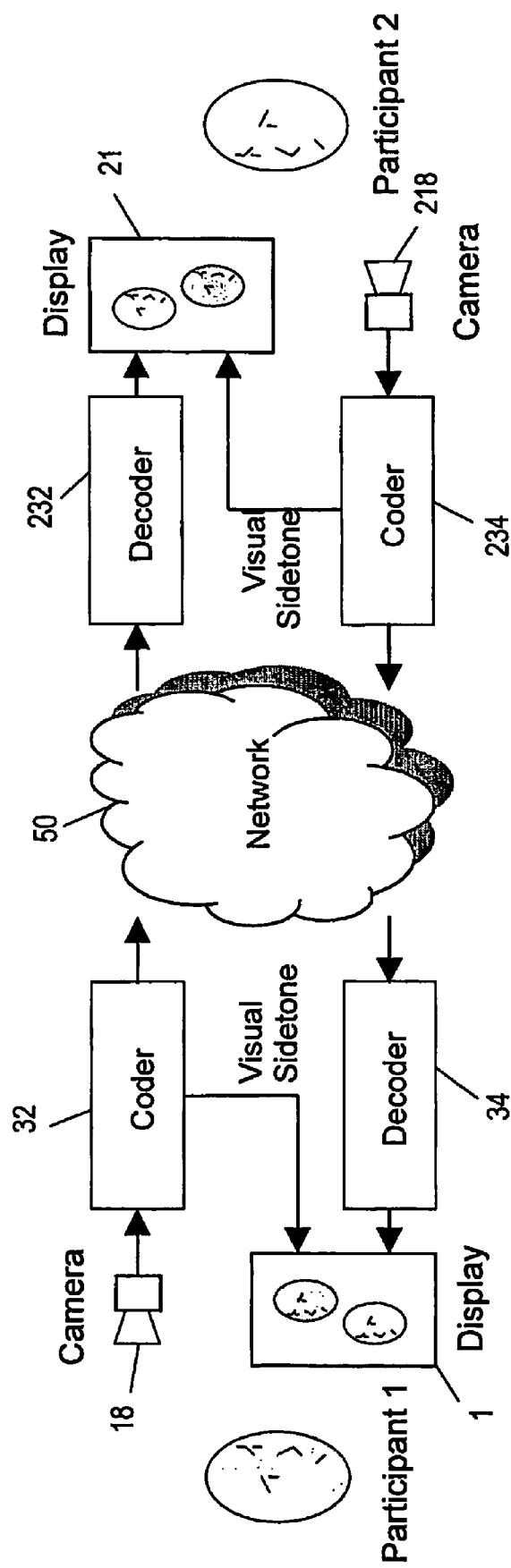
FIG. 3 is a system block diagram illustrating the general components required to provide a visual sidetone.
Figure 4:
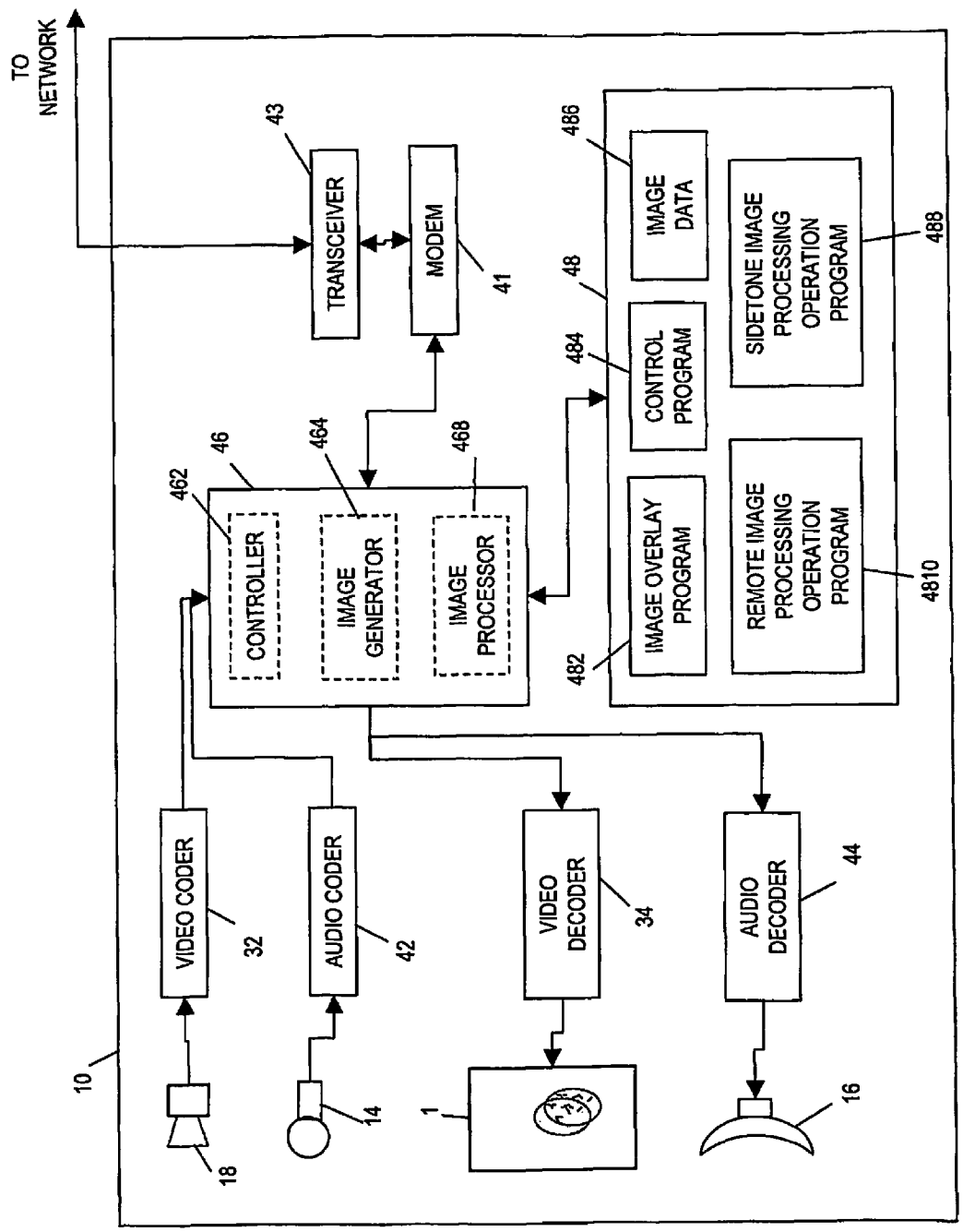
FIG. 4 is a system block diagram of the system elements used by an apparatus according to the embodiments of the present invention.

In view of the above, referring first to FIGS. 3 and 4, FIG. 3 illustrates the basic elements of two video communications systems which are arranged to communicate with each other over a network, and which may provide visual sidetone signals. More particularly, the left hand side of the diagram illustrates those elements of a first video communications apparatus which is being used by participant 1. The video communications apparatus comprises a display means such as an LCD screen or the like arranged to display a visual sidetone image of participant 1, as well as a video image of the remote participant 2, a camera 18 which is arranged to capture a local image of participant 1, a video coder 32 arranged to receive input from the camera 18, and to digitally encode the image information thereby received, and a video decoder 34 arranged to receive data from a network 50, to decode the image data, and to pass it to the display 1 for display to the user participant 1. The video coder 32 passes the coded local image captured by the camera 18 to the network 50 for transmission thereover, and also passes the coded local video data to the decoder 34, where it is decoded and then passed to the display 1 for display as the visual sidetone.

The local video data passed by the coder 32 to the network 50 is transmitted via the network 50 to a second video communications apparatus, being used by a user participant 2. At the second video communications apparatus a decoder 232 is provided which is arranged to receive the video image data from the network 50, to decode the video image data, and to pass the decoded image to a display 21 for display to the user participant 2. In common with the first communications apparatus, the second video communications apparatus also comprises a camera 218 arranged to capture local images of the user participant 2, and to pass those local images to a video coder 234 for coding and subsequent transmission onto the network 50 for transport to the first video communications apparatus being used by participant 1. Additionally, the video coder 234 also passes the coded local image of participant 2 to the decoder 232 for decoding and subsequent display as a visual sidetone signal of the image of participant 2 on the display 21.

Thus, as provided by the arrangement shown in FIG. 3, a video communications apparatus can capture local images of its own user, and transmit these images to a remote apparatus, as well as receiving remote images from that same remote apparatus. Both the remote image received from the remote apparatus, and the local image are then displayed to the user on the same display. It should be noted here that such a general architecture is characteristic of the prior art visual sidetone systems mentioned earlier as well as the embodiments of the present invention. The embodiments of the present invention are distinguished from the prior art by the provision of further system elements for processing the images in a particular way, however, as will become clear from the following.

Turning now to FIG. 4, this illustrates in more detail the specific system elements required by a video communications apparatus provided by the embodiments of the present invention. More particularly, a video communications video apparatus 10 according to the embodiments comprises a display screen 1, such as an LCD screen or the like, arranged to display a composite sidetone image and remote image to the user. Additionally provided are a camera 18 arranged to capture local images of the local user, and a microphone 14 arranged to capture any local sounds in the vicinity of the apparatus 10. A sounder or speaker 16 is further provided arranged to output sounds from the video communications apparatus to the user. To receive and encode the local images captured by the camera 18, a video coder 32 is provided arranged to receive the output of the camera 18, to digitally encode the data as image data, and to pass the encoded image data to a central control unit 46. Similarly, in order to encode any analogue audio signals generated by the microphone 14, an audio coder 42 is provided arranged to digitally encode the analogue input signals, and to provide a digital audio signal to the controller 46 as an input thereto. In order to reproduce digital audio and video signals, the controller 46 is arranged to pass video image data to a video decoder 34 which decodes the video image data, and supplies a video image to the display 1, as well as an audio decoder 44 which receives encoded digital audio data from the controller 46, decodes the digital audio data to produce an analogue audio signal, which is then used as an input to the speaker or sounder 16. It will be understood that each of the camera 18, microphone 14, display 1, speaker or sounder 16, video coder 32, audio coder 42, video decoder 34, and audio decoder 44 are conventional elements, which are already known in the art, and employed within existing mobile communications apparatus, such as mobile camera telephones produced by Nokia, or the like.

Additionally provided within the apparatus 10 is the controller unit 46 which comprises a processor unit capable of using software programs, so as to process image and audio data according to any relevant programs, and to generally control operation of the video communications apparatus to transmit and receive video and audio data and to receive and output video and audio information from and to the user. For the purposes of the present embodiments, the central control unit 46 can be considered to comprise a controller unit 462 which controls the overall operation of the apparatus, an image generator unit 464 which generates image data for output to the video decoder 34 and subsequent display on the display 1, and an image processor unit 464 which processes input image data in accordance with one of several available image processing operations.

In order to allow the central control unit 46 to operate, a data storage unit 48 is provided in which is stored various software control programs which may be used by the central control unit 46, as well as any image data or audio data which is to be output from the apparatus, or has been captured thereby. More specifically, in the context of the embodiments the data storage unit 48 stores an image overlay program 482 which is used by the image generator unit 464 to generate images for display, a control program 484 which is used by the controller unit 462 to control the overall operation of the video communications apparatus, a remote image processing operation program 481 which is used by the image processor unit 468 to process remote images received from any remote video communications apparatus with which the present apparatus is communicating via the network, and a sidetone image processing operation program 488 which is also used by the image processor 468 to process the local images captured by the camera 18 so as to allow them to be used as sidetone images, as will be described. Additionally provided within the data storage unit 48 is an area 486 for storing image data, which data may be the raw input (and remote) images, as well as the processed images generated by the image processor 468, or the generated images generated by the image generator 464. It will be further understood that the data storage unit 48 also stores other software programs and data to enable the video communications apparatus to perform its standard functions, such as, for example, to communicate over the network.

In order to enable communication via the network, the video communications apparatus is further provided with a modem 41, and a transceiver 43, the modem 41 receiving audio and video data to be transmit over the network from the central control unit 46, and acting to modulate the data, the modulated data then being passed to the transceiver 43 for actual transmission. Similarly, the transceiver 43 receives signals from the network, which are then passed to the modem 41 for demodulation, the resulting recovered data then being passed to the central control unit 46. It should be understood within the context of the invention that the modem 41 and transceiver 43 are entirely conventional, and are provided to allow the device to communicate with other devices via the network. Moreover, it should be understood that the network may be any conventional network, such as an Ethernet, or wireless LAN network such as described in the various IEEE 802.11 standards, or a cellular network such as a UMTS network. Additionally, in other embodiments the apparatuses need not necessarily communicate via a network as such, but may use direct communications such as via infra-red or optical means, or wirelessly using Bluetooth™ techniques; Whatever the mode of communication between the devices it should be understood that the transceiver and modem are arranged to facilitate such communication.

The video communications apparatus as just described is used in each embodiment of the invention to be described herein, the differences between each embodiment lying in the operation of the image processor 468 in accordance with the remote image processing operation program 4810 and the sidetone image processing operation program 488, and the subsequent operation of the image generator 464 under the control of the image overlay program 482. As was mentioned previously, in addition, the overall operation of the video communication apparatus is under the control of the controller 462 in accordance with instructions contained within the control program 484.

Having described the general apparatus architecture, four specific image processing operations will now be described. The image processing operations to be described will be performed by the image processor 468 under the control of either the remote image processing operation program 4810, or the sidetone image processing operation program 488, depending on the embodiment.

A first image processing operation will be described with respect to FIG. 15. Here, an input image 150 of the face of a user is used as the input. Then, the first operation that is performed at step 15.2 is to increase the apparent image opacity. This is very similar to increasing the brightness and reducing the contrast of the image, or performing a gamma adjustment, and each of these methods may alternatively be used. Within the specific image processing operation presently described, however, the pixel values in the resulting image of increased opacity are calculated as follows.

For every pixel p(x,y) in the raw camera image, the intensity of the equivalent pixel $p'_i(x,y)$ is computed in the Visual Sidetone image. By:

$$p'_i(x, y) = \frac{1}{9} \sum_{dx=-1}^{1} \sum_{dy=-1}^{1} p_i(x+dx, y+dy) \cdot \frac{\alpha}{2^n - 1} + \beta \qquad \text{Equation 1}$$

where α and β adjust the apparent opaque properties of the resultant image. α and β are typically equal; in the examples given they have the value of 150. n is the number of bits representing the intensity level, where this is a level ranging from zero to a maximum value given by $2^n-1$. Typically n would be eight, giving a range of 0 to 255.

Once the image opacity has been increased, then next, at step 15.4 the image is smoothed by the application of a convolution kernel K, as follows:

$$K = \begin{bmatrix} 1/9 & 1/9 & 1/9 \\ 1/9 & 1/9 & 1/9 \\ 1/9 & 1/9 & 1/9 \end{bmatrix} \qquad \text{Equation 2}$$

The effect of these two image processing operations i.e. increasing the image opacity, and removing the high frequencies in the image with a smoothing operation is to make the image close to white and out of focus, for the purpose of making the image less visually attentive. It should be noted that the convolution kernel (K) represents a simple method of smoothing the image; there are many other smoothing operations well known in the art which may be substituted here.

Figure 15:
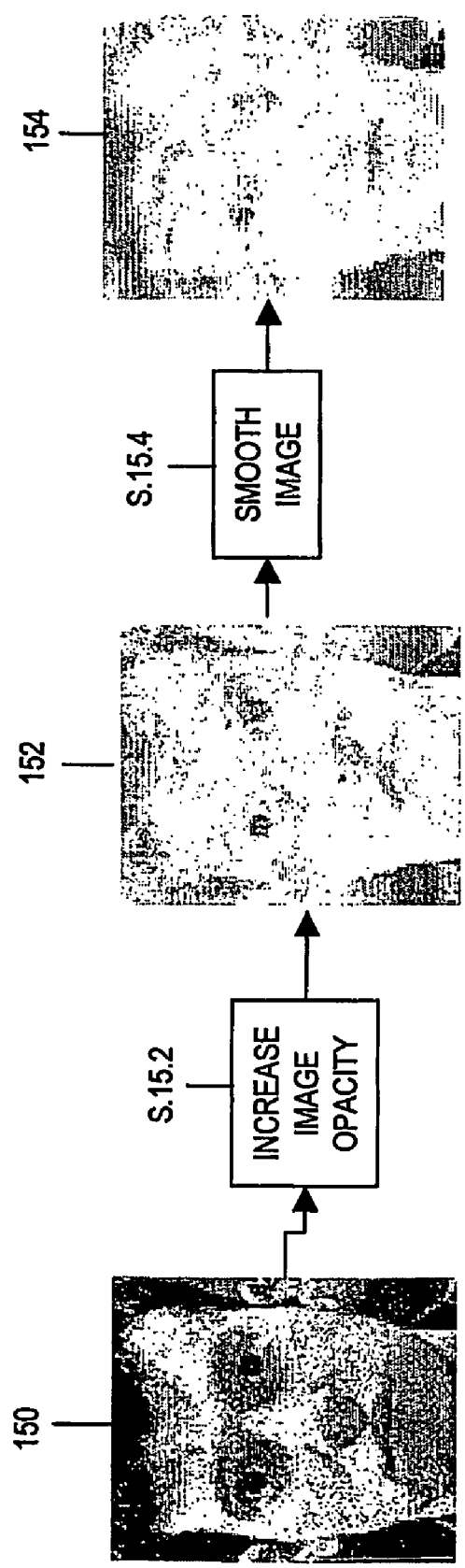
FIG. 15 is a block diagram illustrating one of the image processing operations which may be used by embodiments of the present invention.

The processing provided by the image processing operation shown in FIG. 15 may be used to process either the local image to produce a sidetone image, or to produce an image for transmission, or to process a received remote image prior to display, depending on the embodiments. That is, either the remote image processing operation program 4810 or the sidetone image processing operation program 488 may control the image processor 468 to perform the image processing operation of FIG. 15, depending on the embodiment, as will become apparent later.

Figure 16:
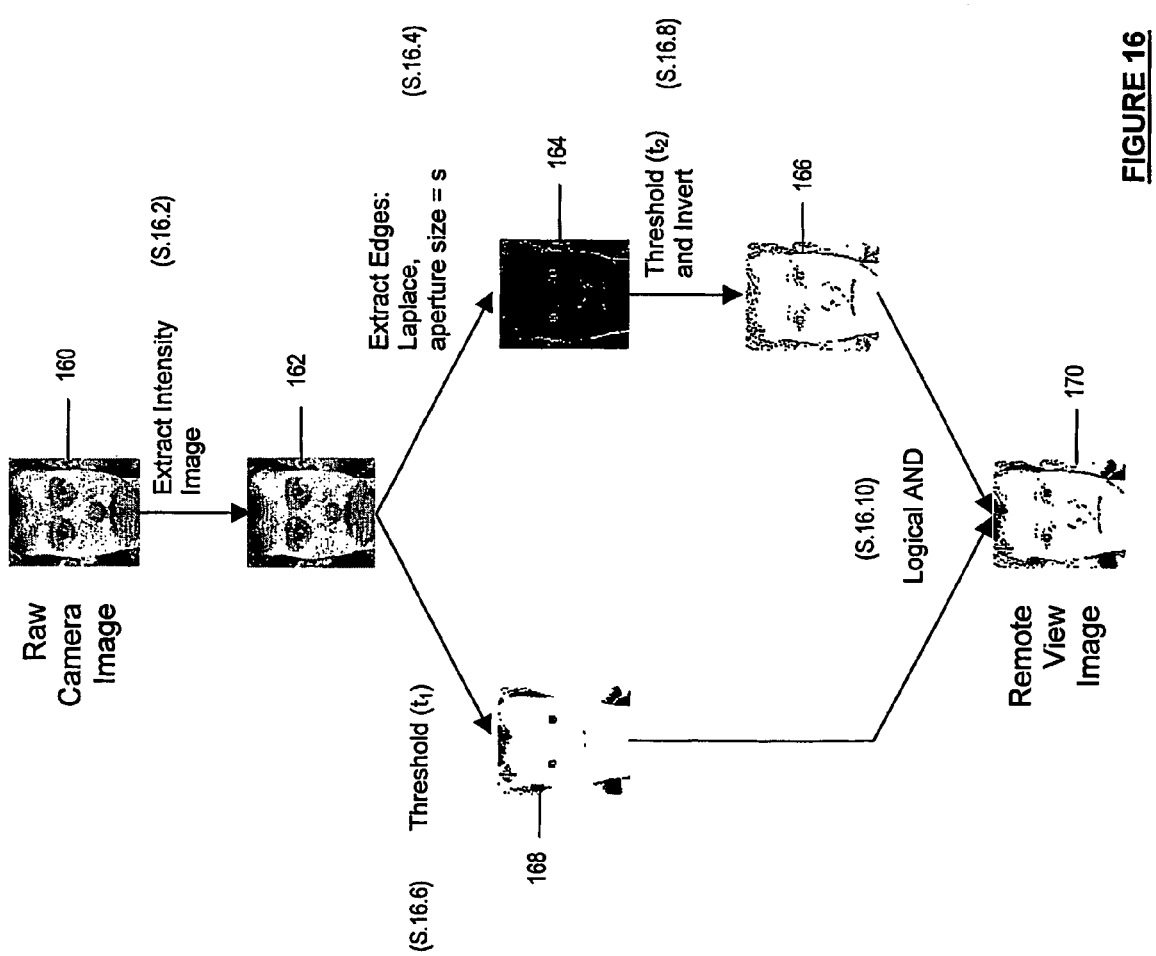
FIG. 16 is a process diagram illustrating another of the image processing operations which may be used by the embodiments of the present invention.

A second image processing operation which may be performed by the image processor 468 is shown in FIG. 16. Here, a raw camera image 160 of the face of a user is used as input to the processing operation, and the first step within the operation at step 16.2 is to extract the intensity of each pixel to form an intensity image 162. Where the input image is in a component video format where each pixel has a luminance value and chrominance values, then the intensity image can be easily formed simply by taking the luminance pixel value for each pixel. Where the input image is in an alternative format (such as RGB, or the like) then additional processing will be required to extract the intensity of each pixel, but such processing is well known in the art.

Having obtained the intensity image 162, two threads of processing are then performed using the intensity image as input. In a first thread of processing, commenced at step 16.6, a threshold $T_1$ is applied to the pixel values of the intensity image 162, to give a first thresholded image 168. This thresholded image 168 is then stored in the image data area 486 of the data storage unit 48, for later use.

The second thread of processing takes as its input the intensity image 162, and at step 16.4 applies a Laplacian edge detector to the image to produce an edge map 164. Laplacian edge detector algorithms are well known in the art and hence will not be described further here. The resulting edge map 164 is then subject to a thresholding operation using a threshold $T_2$ and inversion operation at step 16.8. This gives a thresholded and inverted edge map image 166, which is also stored in the image data area 486.

At this stage, therefore, the thresholded and inverted edge map image 166, and the thresholded intensity image 168 are being stored, and at step 16.10 the image processor 468 acts to generate an output image, by performing a logical AND for each respective corresponding pixel position of the thresholded intensity image 168, and the thresholded and inverted edge map 166, to produce a third pixel value which is used in the corresponding position in the output image. Here, the logical AND operation assumes that a white pixel is TRUE and a black pixel is FALSE. As the effect of the thresholding applied to each of the image 168 and 166 is to reduce the grey scale depth of each pixel to one bit, the resulting generated image 170 is also a one bit per pixel image but including both shading of the main features, as well as the feature edges.

It should be noted that the image processing operation of FIG. 16 as described above is known per se from Pearson D E, and Robinson J A "Visual Communication at Very Low Data Rates" proceedings of the IEEE, Vol 4, (April 1985), pp 975-812. The advantages of an image generated by this technique are that by using spatial and temporal compression, such an image can be sent over a very low bandwidth connection, and hence may be very suitable for current mobile telephone networks (such as UMTS, and GPRS networks). Additionally such images also contain the essential facial features allowing identity and expression to be distinguished, whilst being of high contrast and hence readily distinguishable and attention inducing.

As with the first image processing operation described in respect to FIG. 15, the second image processing operation described in FIG. 16 may be applied to local images to generate either a sidetone image, or an image to be transmit, or to a received remote image, depending on the embodiment. Further uses of the image processing operation of FIG. 16 will become apparent from the specific description of the embodiments given later.

A third image processing operation will now be described with respect to FIG. 17. This image processing operation of FIG. 17 shares some common elements with that previously described in respect of FIG. 16, and the common steps and elements share common reference numerals therein. Therefore, an input image 160 is first subject at step 16.2 to a pixel intensity extraction operation, to give an intensity image 162. The intensity image 162 is then used as the input to two processing threads, a first of which, in common with FIG. 16, uses a Laplacian edge extraction operation at step 16.4 to give an edge map 164. This edge map is then simply inverted at step 17.2, to give an inverted edge map image 172. This inverted edge map image 172 may then be stored in the image data store 486 for later use.

The second processing thread entails step 17.4, wherein the intensity image 162 is subject to a brightening operation for example using gamma correction or the like, to produce a brightened intensity image 176. The brightened intensity image 176 is also stored in the image data store 486.

Having generated the inverted edge map image 172, and the brightened intensity image 176, the next step in the image processing operation at step 17.6 is to compare each respective pixel of the two images, and to select that pixel which has the minimum intensity value as the pixel value in the corresponding respective pixel position in an output image to be generated. Thus an output image 174 is generated which effectively combines the brightened intensity image 176, and the inverted edge image 172. Such an image does not have the bandwidth efficiency of an image generated by the Pearson and Robinson method of FIG. 16 in that the grey scale depth has not been reduced to one bit, but a higher quality more life like image is obtained. As with the previously described image processing operations, the operation of FIG. 17 may be used to process local images for use as a sidetone image, local images for onward transmission, or to process received remote images, depending on the embodiment in which it is employed.

Finally, a fourth image processing operation which may be used will be described with respect to FIG. 20(b). This image processing operation takes as its basis the Pearson and Robinson method of FIG. 16, but adds additional steps thereto. More particularly, and with reference to FIG. 16, having obtained the output image 170 from the Pearson and Robinson method, in the fourth image processing method being described, the resultant image is then subject to a blurring operation, and then a subsequent changing in the intensity levels. Such operations give a resultant image as shown in FIG. 20(b). Such a processing operation could be used as those previously described to generate a local visual sidetone image, to process a local image for onward transmission over the network, or to process a remote image received over the network, but is likely that in most embodiments it would only be used for the first of these purposes, for the reason that it does not produce a particularly clear image, and hence may be unsuitable for use in processing the remote image, which the user at the local video communications apparatus is commonly most interested in seeing.

Figure 17:
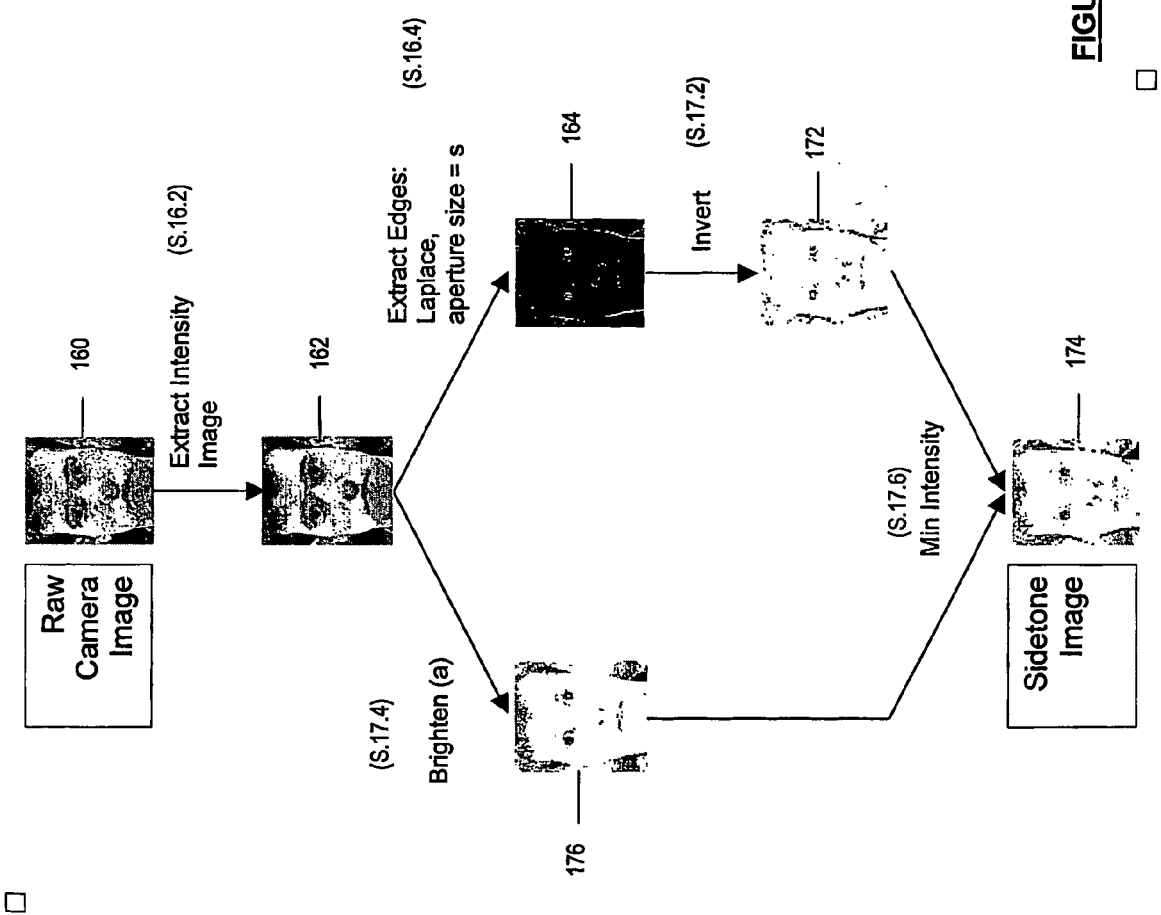
FIG. 17 is a processed diagram of a further image processing operation which may be used by the embodiments of the present invention.

It should also be noted, in addition, that as a variant of this fourth image processing operation, the image processing operation of FIG. 17 may be used in place of the Pearson and Robinson method, and the blurring and intensity level changing operations applied to the output of FIG. 17 instead.

Having described the basic architecture of the video communications apparatus used by each embodiment to be described, as well as the image processing operations, several specific embodiments will now be described with respect to FIGS. 5 to 14.

Figure 5:
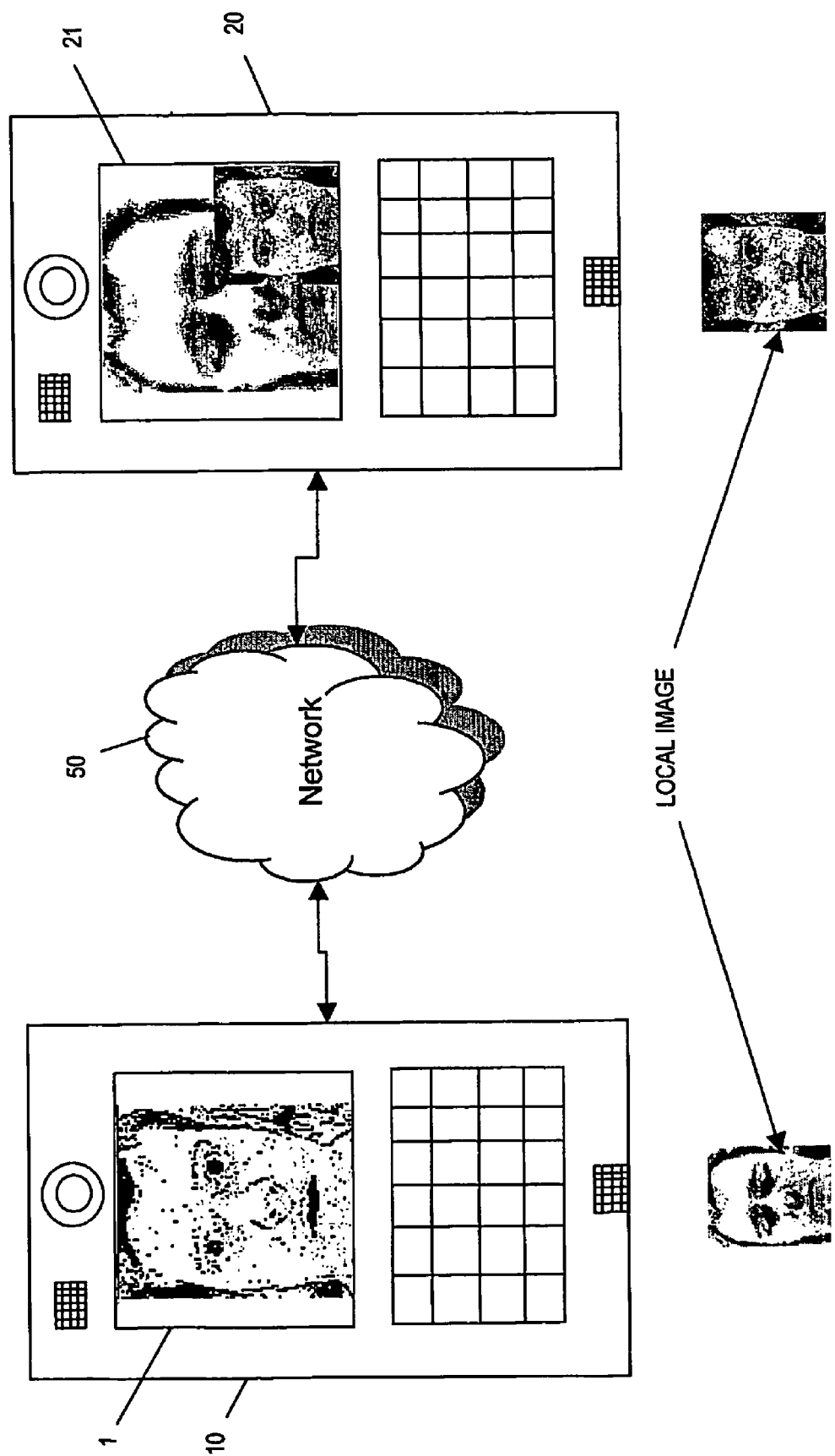
FIG. 5 is a stylistic representation of a first embodiment of the present invention.

A first embodiment of the present invention is shown in FIG. 5. Here, a local video communications apparatus 10 in accordance with the first embodiment is arranged to communicate via a network 50 with a second remote video communications apparatus 20, which operates, for example, in accordance with the prior art. Each of the video communications apparatus 10 and 20 is provided with a camera for capturing local images of the users, a display 1, and 21, and audio input and output such as microphones and speakers. For ease of reference in the following description, the local image of the user captured by each of video communication apparatus's is shown underneath each apparatus.

Within the first embodiment, the video communications apparatus 10 captures a local image of the user using the camera, and also receives a remote image from the remote video communication apparatus 20 via the network 50. The remote video communications apparatus 20 applies no particular processing in the context of the present embodiments to the image that it transmits to the video communications apparatus 10, such that the remote image received via the network 50 at the video communications apparatus 10 is substantially the same as the local image captured at the video communications apparatus 20, and displayed as the visual feedback thereat, subject of course to any effects on the image introduced as a consequence of the transmission. Thus, the remote video communications apparatus 20 operates in accordance with the prior art, whereas the local video communications apparatus 10 operates in accordance with the embodiment of the invention, as described next with respect to FIGS. 7, and 4.

Figure 7:
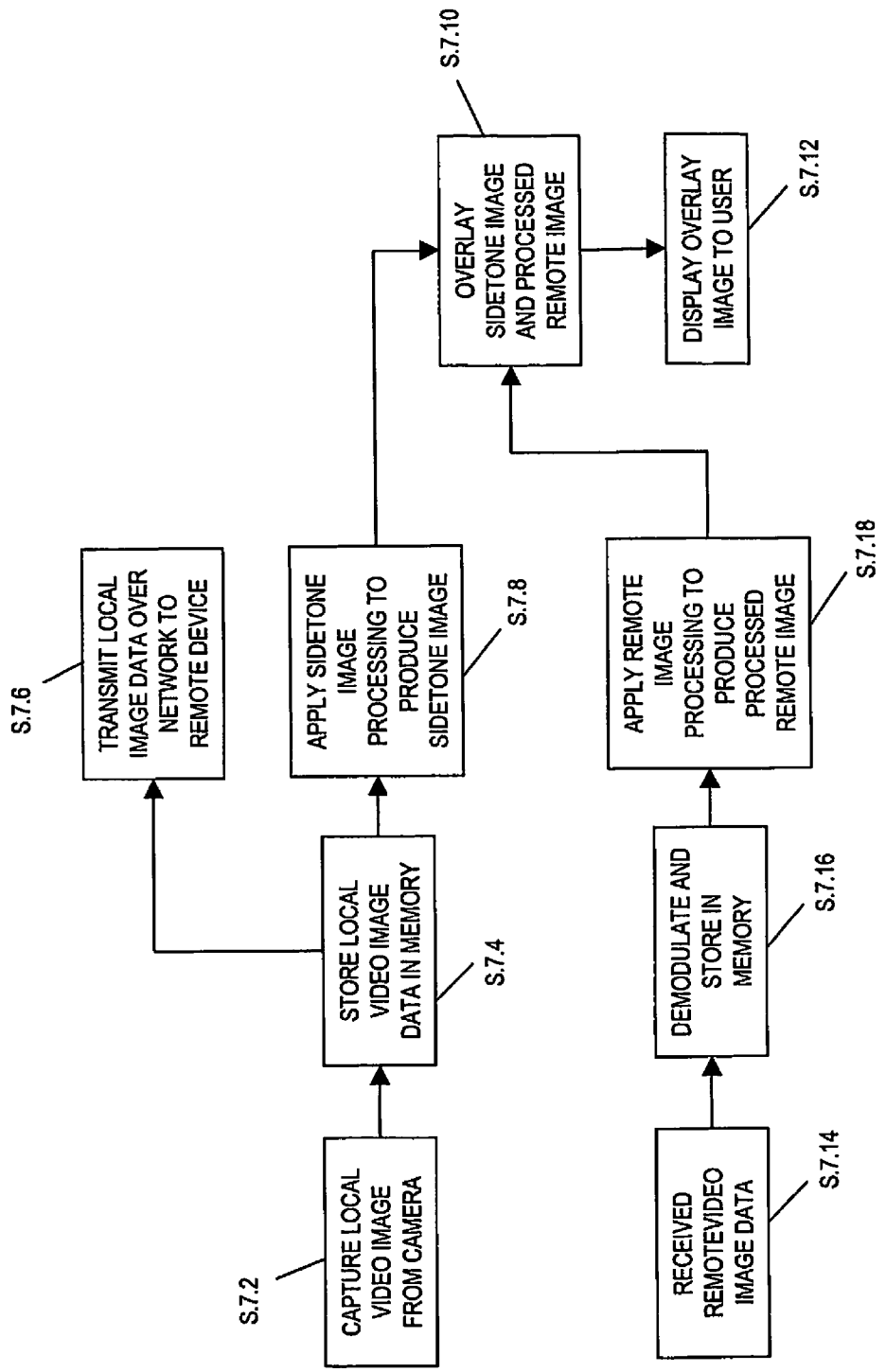
FIG. 7 is a block diagram illustrating the processing steps used in the first and second elements of the present invention.

More particularly, FIG. 7 illustrates a process which is performed by the local video communications apparatus 10, and in particular by the system elements thereof as shown in FIG. 4. There are several processing threads to the overall process performed by the local video communications apparatus 10, and these are described next.

As a first processing thread, at any particular moment in time the camera 18 of the video communications apparatus 10 captures a local video image of the user at step 7.2, and this is coded by the video coder 32 and passed to the central control unit 46. The central control unit 46 then stores the local video image data in the image data portion 486 of the data storage unit 48 at step 7.4. Additionally, the central control unit 46 also passes the local image data to the modem 41 for modulation, which then controls the transceiver to transmit the modulated image data via the network to the remote communications apparatus 20. The transmission of the local image data over the network to the remote video communications apparatus 20 is performed at step 7.6. In addition to transmitting the local image data, the controller 462 in accordance with the control program 484 also causes the image processor 468 to apply the sidetone image processing operation program 488 to the local video image data at step 7.8. In this first embodiment, the sidetone image processing operation program 488 causes the image processor 468 to process the input local image data in accordance with the image processing operation previously described in respect of FIG. 15, to produce a smooth image of increased opacity than the original local video image. This smoothed and increased opacity image is stored in the image data area 486 of the data store 48.

A second processing thread which is performed substantially simultaneously with the thread previously described is commenced at step 7.14. Here, the local video communications apparatus 10 receives remote video image data via the network at step 14. More particularly, the transceiver receives the image data, which is passed to the modem 41, wherein the remote video image data is demodulated and reconstructed, and passed to the central control unit 46, at step 7.16. The central control unit 46 then stores the remote video image data in the image data area 486 of the data store 48, and then, next, controls the image processor unit 468 to run the remote image processing operation program 4810 to process the received remote video image. This is performed at step 7.18, and in this first embodiment the remote image processing operation program 4810 causes the image processor unit 468 to process the received remote video image in accordance with the image processing operation previously described in respect of FIG. 16. The resultant processed remote image is then stored in the image data area 486 of the data store 48.

Having performed the above described operations, the next step is that the controller unit 462 causes the image generator unit 464 to operate in accordance with the image overlay program 482. More particularly, the image overlay program 482 operates at step 7.10 to overlay the generated sidetone image produced at step 7.8 with the processed remote image, produced at step 7.18, such that the features of the respective users' faces are substantially in alignment, to produce a generated overlay image. This procedure is shown in more detail in FIGS. 19(a), (b), and (c) and is performed as follows. For each respective corresponding pixel in the sidetone image and the processed remote image, the respective pixel values from the sidetone image and the processed remote image are compared, and that pixel with the least intensity value is selected for use as the corresponding respective pixel in the generated overlay image. This has the effect that where a white pixel exists in the processed remote image it is replaced by the corresponding pixel in the sidetone image, whereas black pixels within the processed remote image remain unchanged. This results in the processed remote view appearing as if it has been overlaid on top of the sidetone image, in substantial alignment therewith, as shown in FIG. 19(c). The image thus generated by the image generator 464 is then passed to the video decoder 34 which generates a video image for display on the display 1, at step 7.12.

The above described process is repeated for every local video image frame, and every received remote video image frame, such that each local image frame is processed to produce a visual sidetone, and is overlayed with the temporally simultaneous remote image frame duly processed as described. The resultant video image frame is then displayed to the user. When the procedure is repeated in turn for each local video image frame and received remote image frame the result is a video sequence which shows both users in substantially real time with the respective images of each overlaid one on top of the other. However, the processing applied to each image allows the images of both users to be perceived independently, without one image swamping the other image, or otherwise preventing it from being seen. In particular, with respect to this first embodiment, the high contrast of the remote view produced by the image processing operation of FIG. 16 makes it apparently more visible on first inspection, and this is apparent from the static images shown in FIG. 5, but when a video sequence is viewed, the visual sidetone image of the local user is also very apparent. Although not apparent from the static images of the technique shown herein, when the technique is implemented and video sequences generated using the above described process and apparatus, the effect is much more marked. The perception of the two individual users is analogous but not identical to the experience of looking through a head up display (HUD) as are known in prior art aircraft and automobile systems in that it is almost as if the user can "focus" on one or other of the images, without having to shift his eyes from one position to another.

Figure 6:
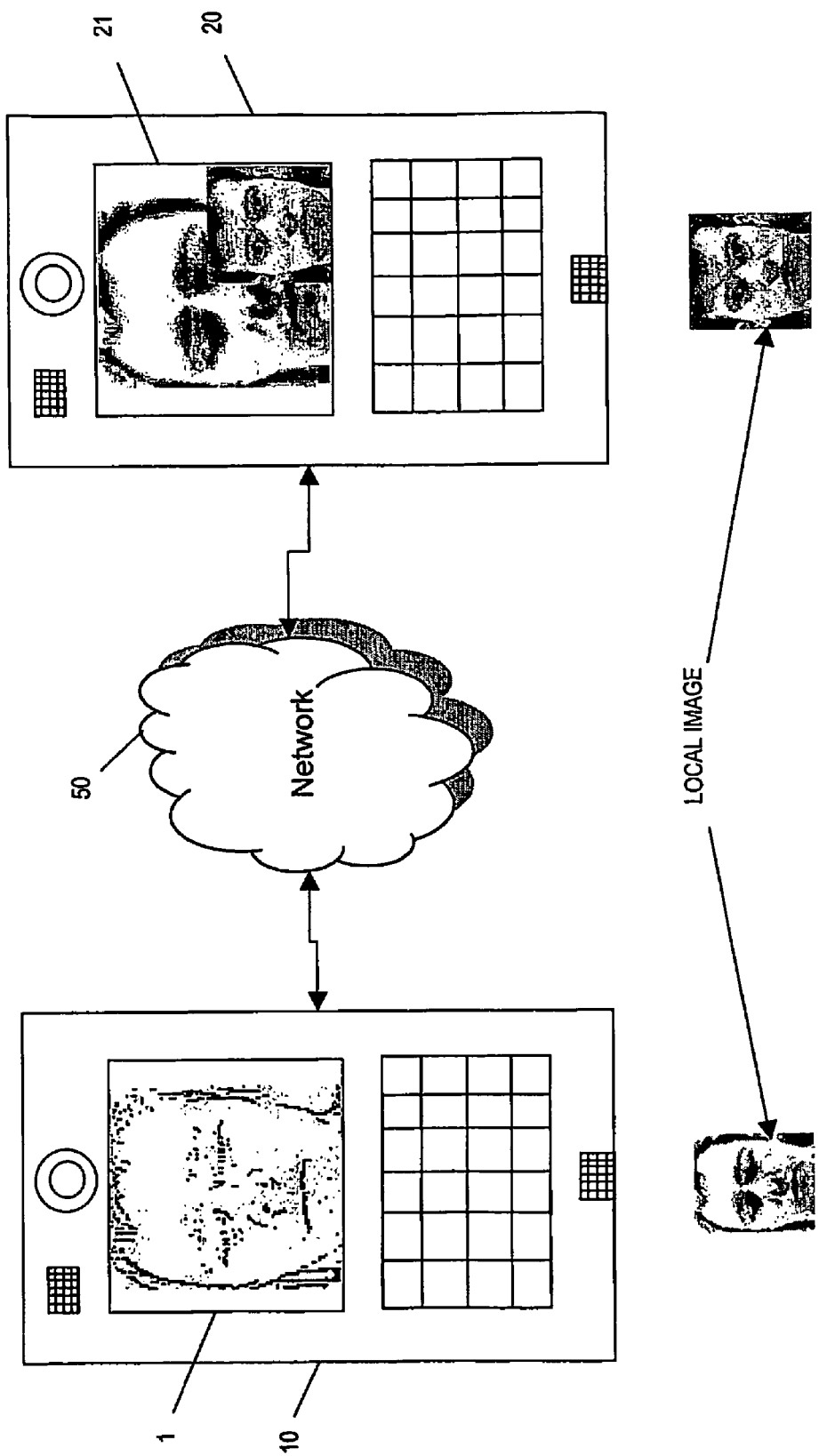
FIG. 6 is a stylistic representation of a second embodiment of the present invention.

A second embodiment of the invention closely related to the first embodiment is shown in FIG. 6. Here, the operation of the second embodiment is substantially identical to that as already described in respect of the first embodiment, with the difference that the processing operations applied to the local and remote images have been swapped around. More particularly, whereas within the first embodiment the remote image processing operation program 4810 controlled the image processor 468 to perform the image processing image operation of FIG. 16, within the second embodiment the remote image processing operation program 4810 causes the image processor 468 to process the remote image in accordance with the image processing operation of FIG. 15 as previously described. Conversely, the sidetone image processing operation program 488 within the second embodiment causes the image processor 468 to process the local image in accordance with FIG. 16, to produce the sidetone image. Thus, within the second embodiment when compared to the first embodiment the received remote image in the second embodiment is processed identically to the local image within the first embodiment, and the local image within the second embodiment is processed identically to that of the remote image within the first embodiment. Within the second embodiment the operation of the image generator 464 in accordance with the image overlay program 482 is substantially identical to that as described previously in respect of the first embodiment (allowing for the swapping of the image processing operations—it is the white pixels of the sidetone image which would be replaced by the corresponding pixel of the remote image), and is illustrated in FIGS. 18(a), (b), and (c).

Figure 8:
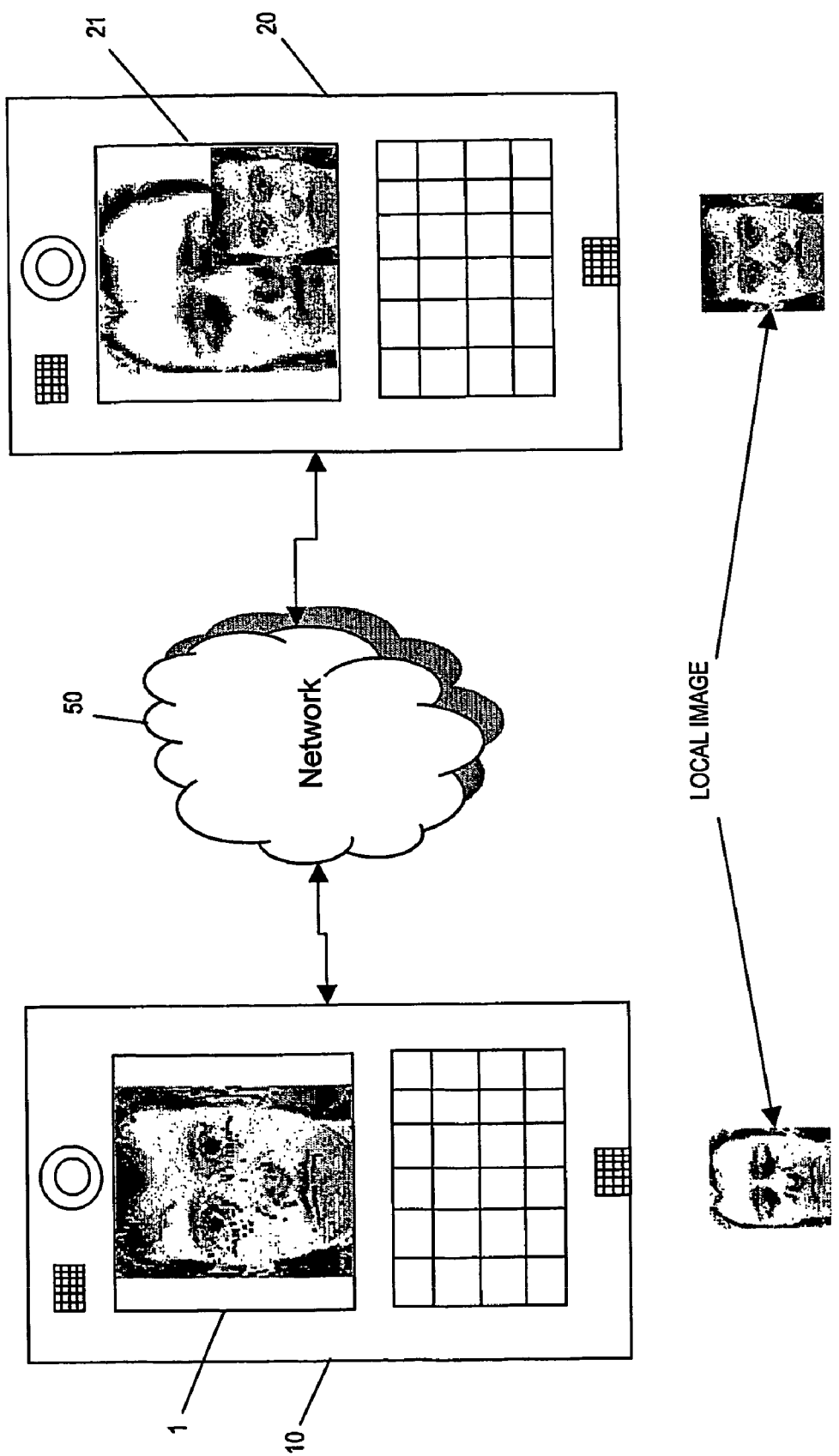
FIG. 8 is a stylistic representation of a third embodiment of the present invention of a third embodiment of the present invention.
Figure 10:
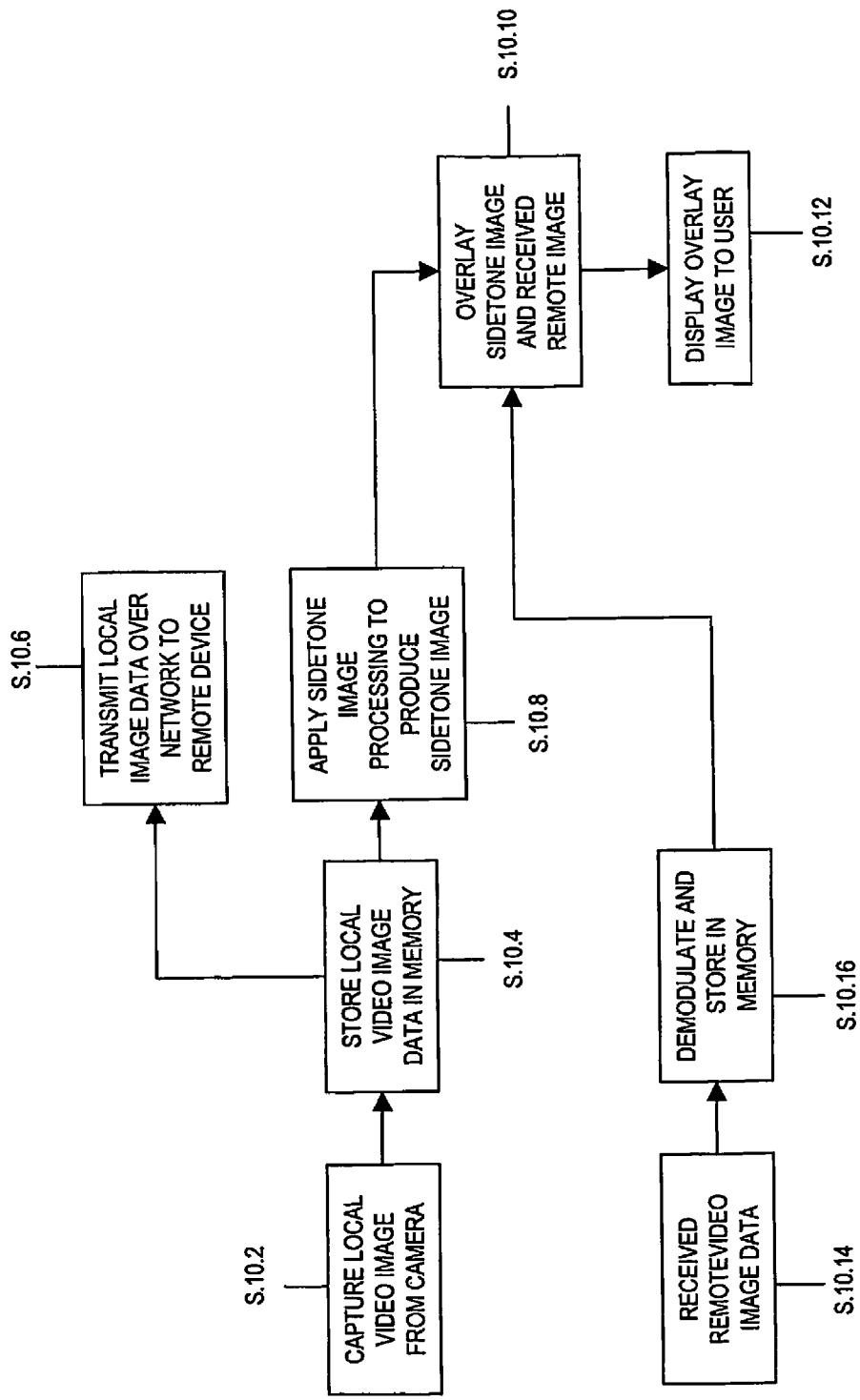
FIG. 10 is a block diagram illustrating the processing steps performed by third and fourth embodiments of the present invention.

A third embodiment of the invention will now be described with respect to FIGS. 8 and 10. Within the third embodiment, the arrangement of the remote video apparatus 20 is identical to that as previously described in respect of the first and second embodiments, in that it operates substantially in accordance with the prior art principles hereby the visual sidetone is displayed to the user as a separate image from the remote image. With regards to the local video communications apparatus 10, however, the operation thereof is as shown in FIG. 10. It will be seen by comparing FIG. 10 with FIG. 7 that the operation of the third embodiment is similar to that of the first embodiment, but with the difference that no processing is applied to the received remote video image, and different processing is applied to the local image to generate the sidetone image. More particularly, within the third embodiment, steps 10.2, 10.4, 10.6, 10.14, and 10.16, are respectively identical to step 7.2, step 7.4, step 7.6, step 7.14, and step 7.16 as previously described in the first and second embodiments. However, at step 10.8 the sidetone image processing operation program 488 controls the image processing 468 to apply the image processing operation of FIG. 16 to the local image, to generate a high contrast, low bandwidth sidetone image.

Following step 10.8, at step 10.10 the generated low bandwidth sidetone image is then overlayed onto the received remote image, by the image generator 464 operating in accordance with the image overlay program 482. The image generation operation to overlay the images is identical to that as previously described in respect of the first and second embodiments that is, effectively every white pixel of the sidetone image is replaced by its corresponding respective pixel in the received remote image.

Following step 10.10 the generated overlay composite image is displayed to the user on the display screen 1, as shown.

In a variation of the third embodiment to provide a further embodiment, instead of applying the image processing operation of FIG. 16 at step 10.8, the sidetone image processing operation program 488 can instead control the image processor 468 to perform the image processing operation of FIG. 17 as previously described, to generate the sidetone image. This does not result in a such a low bandwidth sidetone image, but instead in a high contrasting sidetone image of increased quality when compared with the low bandwidth version. Apart from the substitution of the image processing operation of FIG. 17 into the process, within this variant of the third embodiment the remaining process steps are identical to those as previously described in respect of the third embodiment.

Figure 9:
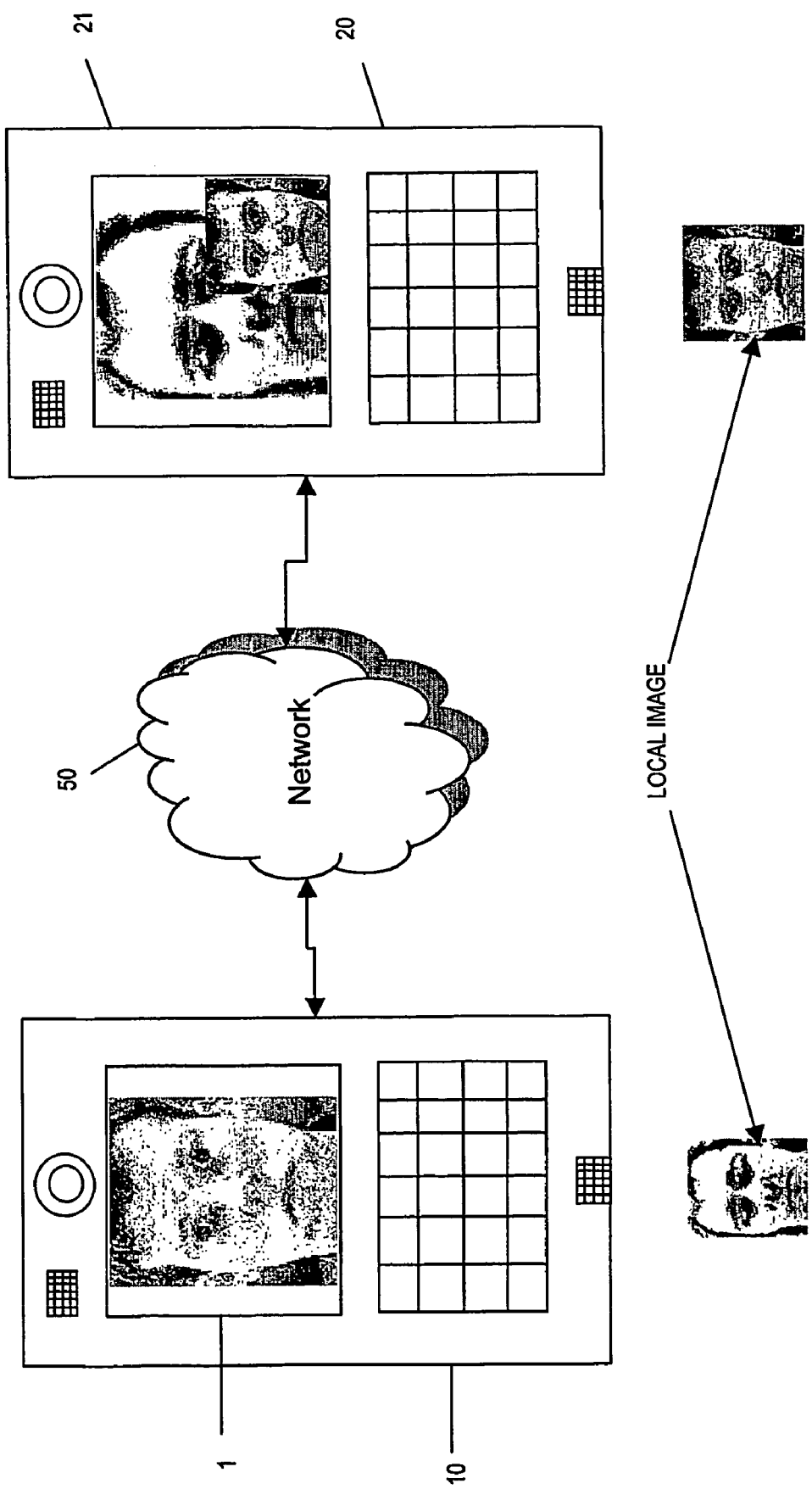
FIG. 9 is a stylistic representation of a fourth embodiment of the present invention.

A fourth embodiment of the invention will now be described with respect to FIG. 9. The operation of the fourth embodiment of the invention is very similar to that as previously described in respect of the third embodiment, in that the received remote image is not processed, but is instead used directly as an input to the image generator 464 for the image overlay operation. The difference between the fourth embodiment and the third embodiment, however, lies in the processing applied to the local image to generate the sidetone image by the image processor 468 at step 10.8. More particularly, within the fourth embodiment the sidetone image processing operation program 488 controls the image processor 468 at step 10.8 to process the local image to generate a sidetone image in accordance with the image processing operation previously described in respect of FIG. 20(b). The thus generated sidetone image is then input to the image generator unit 464 which operates in accordance with the image overlay program 482 at step 10.10 to overlay the sidetone image and the received remote image to generate an image for display. Here, the image overlay program 482 controls the image generator image 464 to add the respective intensity values of corresponding pixels within the received remote image and the generated sidetone image to create the generated image for display. That is, for each corresponding pair of pixels from the sidetone and remote images to be added, the intensity value of the grey level sidetone pixel is added to each of the colour pixel values of the remote image. Thus, where a sidetone pixel has intensity i, and the remote image pixel has RGB values r, g, and b, then the resulting pixel will have RGB pixels r+i, g+i, and b+i. Such a procedure is shown in FIG. 20, wherein the received remote image FIG. 20(a) is added to the generated sidetone image as shown in FIG. 20(b) to produce the resultant generated image as shown in FIG. 20(c). The resultant generated image is then passed to the video decoder 34 for display on the display 1, as described previously in respect of the earlier embodiments.

In a variation of the fourth embodiment to provide a further embodiment, instead of the intensity values of the sidetone pixels being added to the remote pixels values to give a brighter image, they may instead be subtracted from the remote pixel values to produce the resultant overlay output image. As the non-feature areas of the sidetone image have an intensity value of 0, this would have the effect of darkening the areas of the remote image within the output image only where features of the sidetone image are present.

Within the previously described embodiments, the local video communications apparatus operates in accordance therewith, but the remote video communications apparatus is a standard video communications apparatus of the prior art, in that it does perform the invention. Within further embodiments to be described next, however, both the local video communications apparatus 10, and the remote video communications apparatus 20 can each perform the invention, such that each can be considered an embodiment thereof. Fifth, sixth, and seventh embodiments of the invention will therefore be described next illustrating this feature.

Figure 11:
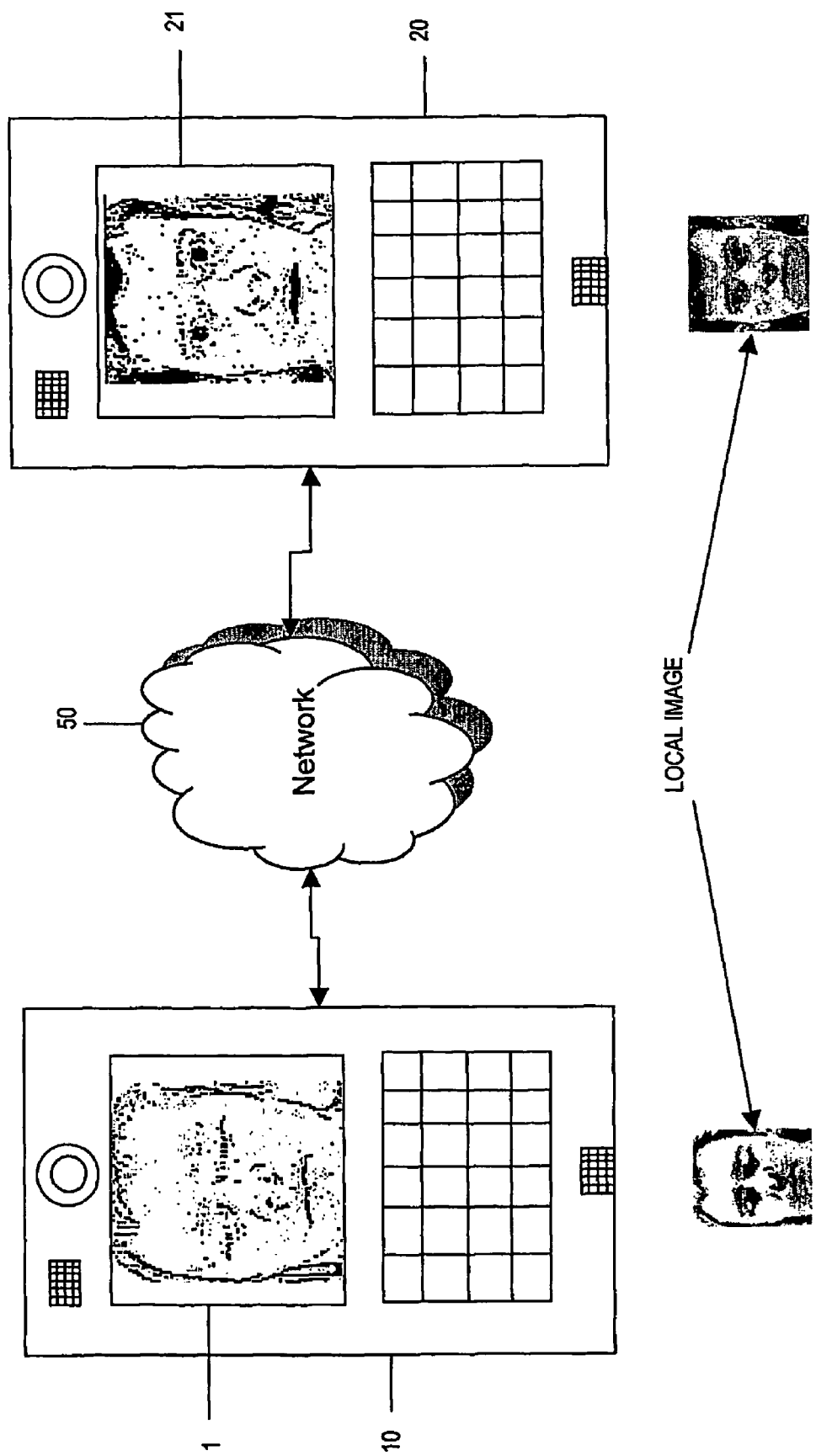
FIG. 11 is a stylistic representation of a fifth embodiment of the present invention.
Figure 14:
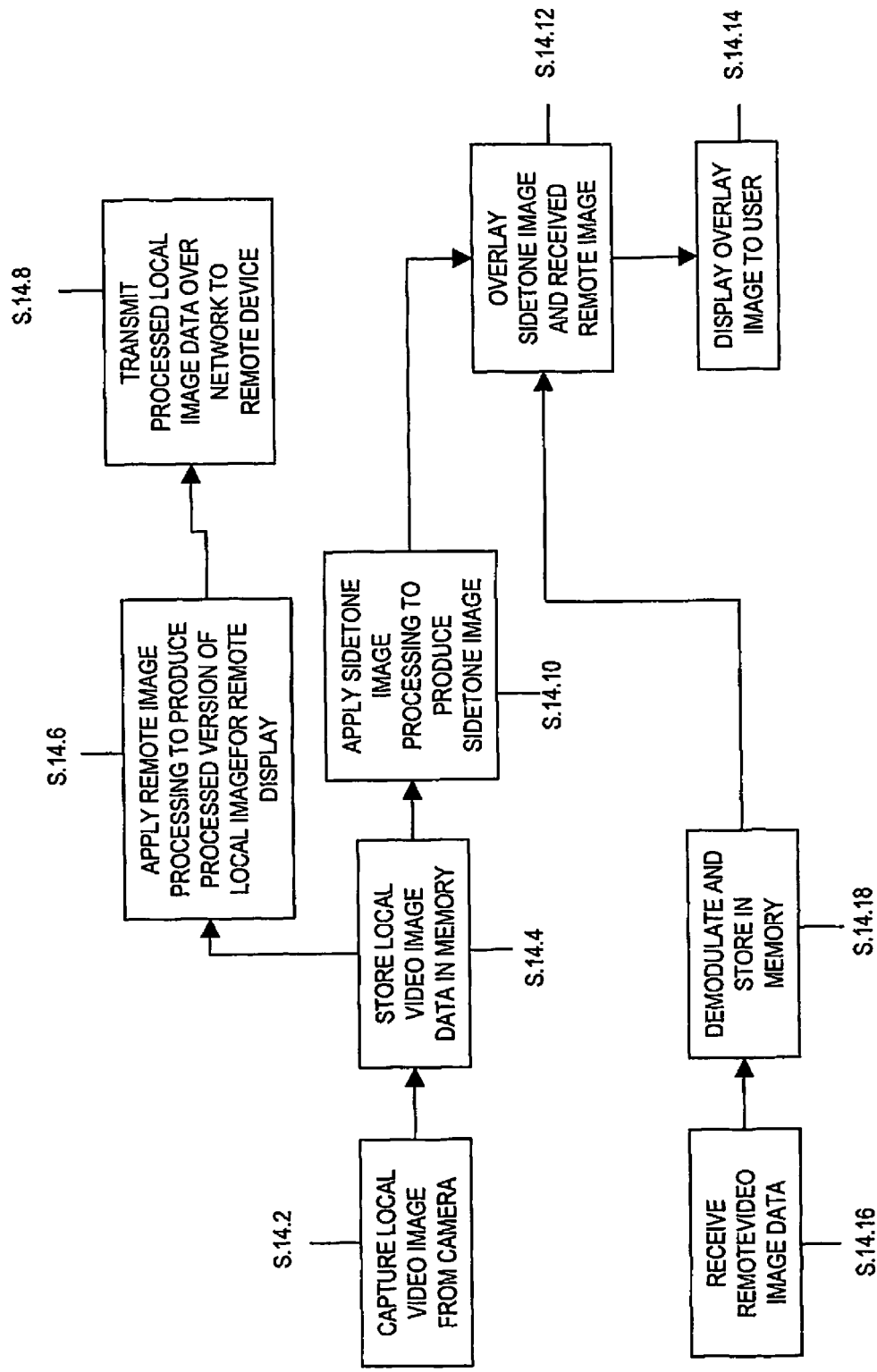
FIG. 14 is a block diagram illustrating the processing steps performed by any of the fifth, sixth, or seventh embodiments of the present invention.

A fifth embodiment of the invention is shown in FIG. 11, with the operating process performed by each of the video communications apparatuses 10 and 20 being shown in the FIG. 14. It should be noted that both the local video communications apparatus 10 and the remote video communications apparatus 20 each operate in accordance with the process shown in FIG. 14, to be described next.

Consider first the local video communications apparatus 10. With reference to FIG. 14, at step 14.2 the camera provided on the video communications apparatus 10 captures a local video image of the user, which is then stored in the image data area 486 of the data storage unit 48 at step 14.4. This stored local video image data is then subjected to several processing threads, and a first processing thread at step 14.10 causes the image processor unit 468 to operate in accordance with the sidetone image processing operation program 488 to apply the image processing operation of FIG. 16 to the local video image to produce a sidetone image for display. The sidetone image thus produced is also stored in the image data area 486, for later use.

In addition to producing a sidetone image from the local video image, at step 14.6 the controller unit 462 under the control of the control program 484 controls the image processor unit 468 to further operate in accordance with the remote image processing operation program 4810 so as to apply the image processing operation of FIG. 15 to the local image to produce a processed version of the local image that is then suitable for display on the screen of the remote video communications device 20. Thus, within this embodiment, the image processor unit 468 is controlled to run both the sidetone image processing operation 488, and the remote image processing operation 4810 using the local video image as input, to produce both a sidetone version of the image for local display, and a processed remote version of the local image for remote display.

Having produced the processed version of the local image for remote display, at step 14.8 the video communications apparatus transmits the processed local data, which has been processed by the remote image processing operation program 4810, to the remote video communications apparatus 20 via the network 50.

Prior to continuing with the description of the operation of the local video communications apparatus 10, we will now consider the operation of the remote video communications apparatus 20. In this respect, the remote video communications apparatus 20 operates identically to the local video communications apparatus 10 in that it captures it's own respective local video image of it's user, and processes the local video image so as to produce both a sidetone version of the image, and also to produce a version of the image suitable for remote display on the local video communications apparatus 10. This second processed version of the local image is then transmit via the network 50 to the local video communications apparatus 10 for use thereby.

Returning to a consideration of the operation of the local video communications apparatus 10, at step 14.16 the local video communications apparatus 10 receives the remote video image data from the remote video communications apparatus 20 via the network 50, and at step 14.18 demodulates the image data, and stores it in the image data area 486 of the memory 48. It should be noted at this point that as the remote video communications apparatus 20 has already processed the remote video image data received by the local video communications apparatus 10, then no further processing is required thereby in order to render the received image suitable for input to the image generator unit 464 so as to produce the overlay image for display. Therefore, having performed both steps 14.10 and steps 14.18, and having stored in the image data area 486 of the memory 48 both the sidetone version of the local image, and the received remote image, the next step performed is that of step 14.12, wherein the controller unit 462 controls the image generator unit 464 to operate in accordance with the image overlay program 482, so as to overlay both the sidetone image and the received remote image to produce an overlay image for display. The operation of the overlay program within this fifth embodiment is identical to that as previously described in respect of the first and second embodiments. Once the overlay image has been generated, then the overlay image data is fed to the video decoder 34, for subsequent display on the display screen 1 at step 14.14. Thus, the local video communications apparatus 10 displays the overlay image containing both the sidetone and remote video images to the user.

With respect to the remote video communications apparatus 20, the operation thereof is identical to that of the local video communications apparatus, in that as the local video communications apparatus has already processed it's own local image to provide a processed version for remote display on the remote video communications apparatus 20, then after the remote video communications apparatus 20 has received that video image data at step 14.16, and stored it in memory at step 14.18, no further processing of the received remote image is necessary. Therefore, the remote video communications apparatus 20 can proceed directly to step 14.12, wherein it's image generator unit 464 operates in accordance with it's own image overlay program 482 to overlay it's own sidetone image with the received remote image at step 14.12, the thus generated overlay image being displayed to the user at step 14.14.

Figure 12:
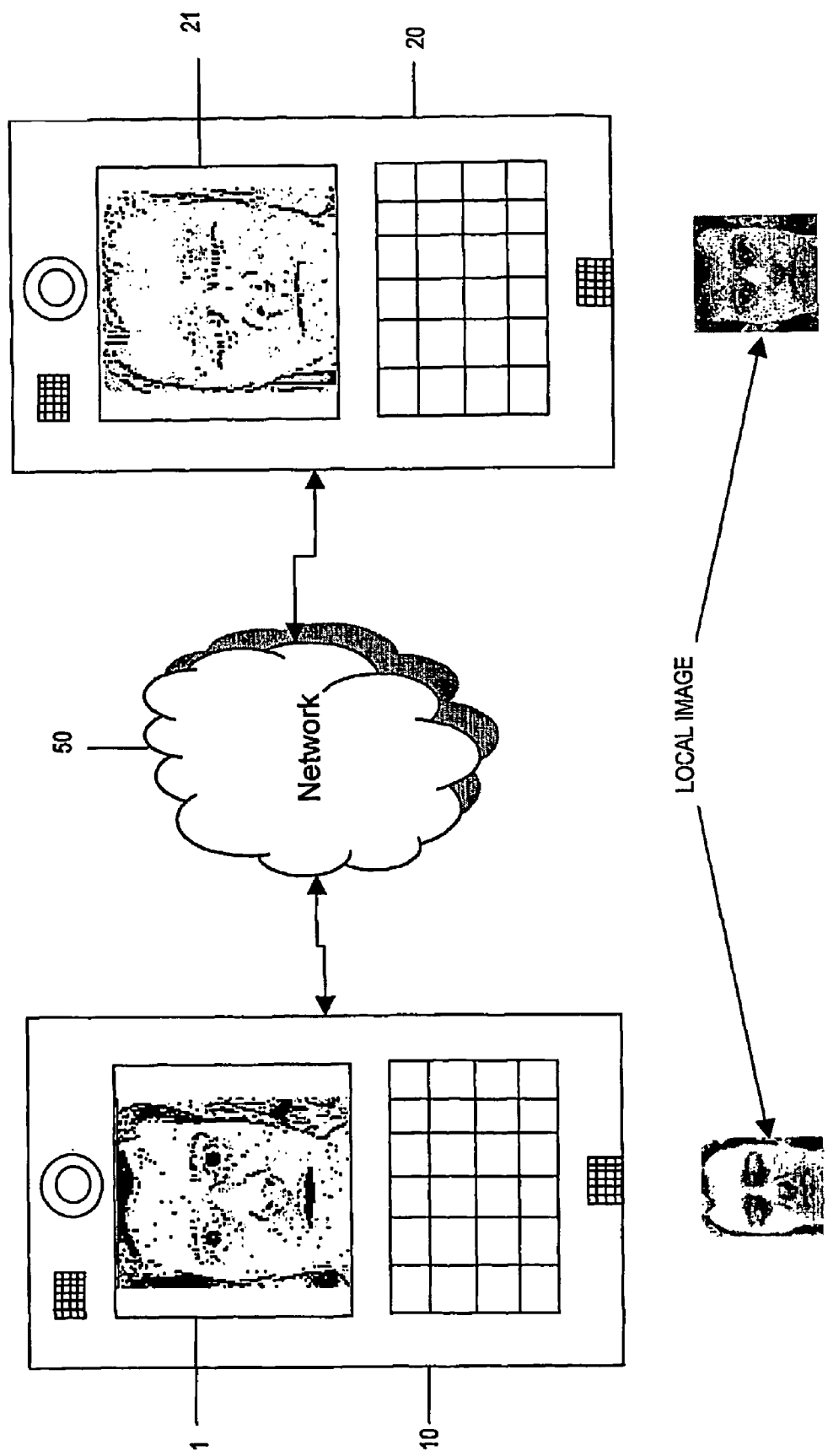
FIG. 12 is a stylistic representation of a sixth embodiment of the present invention.

A sixth embodiment will now be described in respect to FIG. 12. The sixth embodiment operates substantially identically to the previously described fifth embodiment, that with the difference that the image processing operations performed by he image processor 468 when under the control of the sidetone image processing operation program 488, and the remote image processing operation program 4810, are different. More particularly, within the sixth embodiment, the sidetone image processing operation program 488 causes the image process unit 468 to apply the image processing operation of FIG. 15 at step 14.10 to produce the sidetone image, whereas the remote image processing operation program 4810 causes the image processing unit 468 to apply the image processing operation of FIG. 16 at step 14.6, to process the local image to produce the processed version for remote display. In this respect, therefore, the respective image processing operations contained within the sidetone image processing operation program 488, and the remote image processing operation program 4810 with respect to the fifth embodiment have been swapped over. Apart from this distinction, however, the operation of the sixth embodiment is identical to that as previously described in respect of the fifth embodiment.

Within the fifth and sixth embodiments just described, the operation of the local video communications apparatus 10 and the remote video communications apparatus 20 has been identical, and in particular with respect to which image processing operations are applied to their respective local images so as produce their respective sidetone images, and processed versions of the local images for remote display. However, it need not necessarily be the case that both the local video communications apparatus 10 and the remote video communications apparatus 20 apply identical image processing operations to their respective local images, and in a seventh embodiment of the invention the local video communications apparatus 10 applies a different set of image processing operations than the remote video apparatus 20. The seventh embodiment will be described next with respect to FIG. 13.

Figure 13:
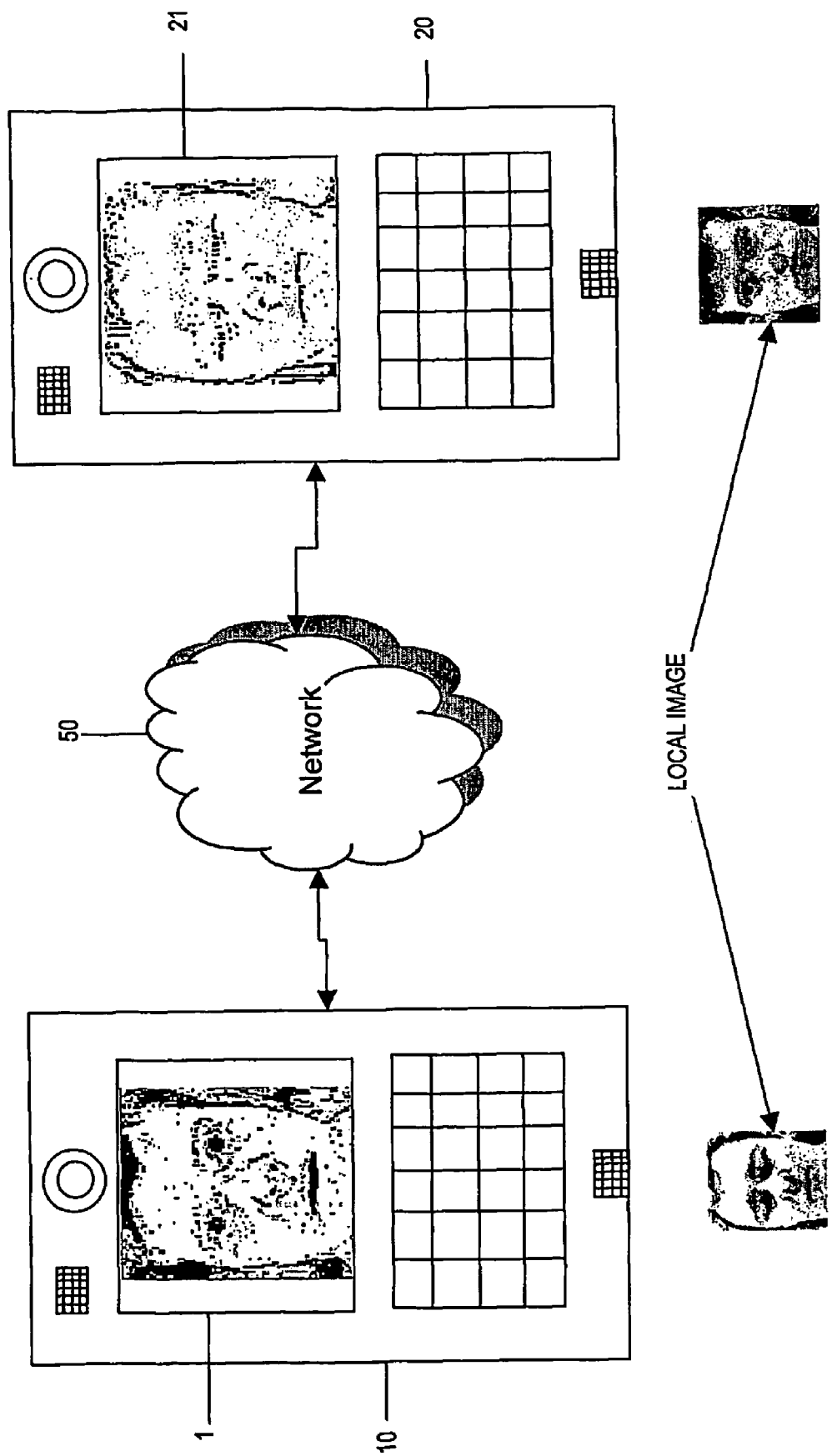
FIG. 13 is a stylistic representation of a seventh embodiment of the present invention.

Within FIG. 13, consider first the operation of the remote video communications apparatus 20. Here, this operation is identical to that as previously described in respect of the sixth embodiment, in that at step 14.10 the remote video communications apparatus applies the image processing operation of FIG. 15 to generate the sidetone image, which is then combined with the received remote video image without further processing the received remote video image, to produce the overlay image at step 14.12. Similarly with the sixth embodiment, the remote video communications video apparatus 20 also processes the local image in accordance with the image processing operation of FIG. 16, to produce a processed version of the local image for remote display by the local video communications apparatus 10, once transmitted thereto via the network 50.

Turning now to the operation of the local video communications apparatus 10, however, here the local video communications apparatus 10 receives the remote video image data at step 14.16 and stores it at step 14.18 as previously described in respect of the fifth and sixth embodiments. With respect to it's local image data, however, this is captured and stored at steps 14.4 as previously described, but when producing the sidetone image at step 14.10, a different image processing operation is applied to that which is used to produce the sidetone image in the remote video communications apparatus 20. The same image processing operation is performed at step 14.6 to produce the processed version of the local image for remote display, however.

More particularly, at step 14.10 the controller unit 462 controls the image processor unit 468 to run the sidetone image processing operation program 488, which causes the image processor 468 to apply the image processing operation of FIG. 16 to generate a sidetone image, but with the added step of then applying a colour wash operation to the produced image, so as to change the colour of the black pixels in the image from black to blue.

The purpose of the colour wash operation is to enable the sidetone image pixels to be distinguished from the those pixels of the remote image, when combined in the overlay image. It should be noted that any colour may be chosen, provided that it is distinguishable from the colour of the pixels in the remote image.

The thus generated sidetone image is then combined with the received remote image at step 14.12 to generate the overlay image, in the same manner as before. This overlay image is then displayed to the user at step 14.14, as shown.

Thus, within the seventh embodiment a different image processing operation is used in each of the local and remote video communications apparatuses to generate the respective sidetone images therefor. It will be understood that any of the described image processing operations may be used by either of the local or remote video communications apparatuses to produce it's respective sidetone image, but preferably that image processing operation which produces a different looking image to the received remote video image is preferred. Thus, for example, where the received remote video image has been processed according to FIG. 15, then the sidetone image is preferably prepared using the image processing operation of FIG. 16, with or without a colour wash as appropriate. Conversely, where the remote image has been processed according to FIG. 16, then the sidetone image may be produced by the image processing operation of FIG. 15, or conversely by the image processing operation of FIG. 16, using a subsequent colour wash to change the pixel colour.

Within all of the embodiments previously described, at least one of the image processing operations used therein has been that of FIG. 16, to produce a low bandwidth, high contrast image. To produce further embodiments, however, it is possible to substitute the image processing operation of FIG. 16 with that of FIG. 17 as previously described, which also produces a high contrast image, but as the image quality is somewhat better, the bandwidth properties thereof are not so low. Additionally, where the image processing operation of FIG. 16 is used with a colour wash operation as a subsequent step, such a subsequent colour wash operation may also be applied to the output of the image processing operation of FIG. 17 as appropriate.

Within the embodiments of the invention it is preferable but not essential for the sidetone image to be processed such that it is visually less attention grabbing than the remote image, as it is thought that users will naturally be more interested in discerning the remote image than the sidetone image. Within each of the first, third, fourth, sixth, and seventh embodiments described above this preferable object is achieved by virtue of the choice of image processing operation which is used to generate the sidetone image. However, in the second and fifth embodiments the respective choice of image processing operations to generate the remote and sidetone images means that the sidetone image may be more visually attentive than the remote image. To overcome this, in variations of the second and fifth embodiments to provide further respective embodiments, either the opacity of the remote image may be reduced, by altering the values of $\alpha$ and $\beta$ used in Equation 1 of the image processing operation of FIG. 15, or the contrast of the line in the sidetone image may be reduced, by increasing the intensity values of the black pixels in the sidetone images so as to render the lines greyer in colour. Either or both of these additional operations may be performed in the further embodiments.

Within each of the embodiments previously described, the, images which have been subject to the image processing operations and used as inputs to the image generator unit 464 to form the overlay image have been video images of the users which has been captured by the built-in cameras 18. However, in other embodiments of the invention this need not necessarily be the case, and for example we also envisage a video communications apparatus which makes use of virtual representations of a user, such as an avatar or like. In such embodiments, a video camera 18 and a video coder 32 are not required to capture local images of the user, but instead a virtual reality unit is provided, which runs in accordance with a virtual reality computer program and is arranged to produce virtual reality style avatar images of the user. These virtual reality avatar images may then be used within the embodiments in place of the local image as captured by the camera in the previously described embodiments, and processed within the pixel domain. With this substitution, i.e. substituting the local video images previously captured by the video camera 18 with the avatar video images generated by a virtual reality unit, the operation of the embodiments using the virtual reality unit is identical to the operation of any of the previously described embodiments.

In an alternative avatar related embodiment, the virtual reality unit renders the avatar image into a format which is immediately suitable for use as a sidetone image; for example, it may render the avatar model as a line drawing or as a line and shade drawing (such as a Pearson and Robinson image, or an image as produced by the related method of FIG. 17). The avatar image may then be overlaid with the remote image in the same manner as described in the previous embodiments.

An eighth embodiment of the invention will now be described with respect to FIG. 21.

Within the previously described embodiments, the processing to produce the sidetone images and the overlaid combination image have each been performed in the respective user terminal handsets 10 and 20. However, in a further embodiment this is not the case, and instead the processing to produce the sidetone images, and the overlay images can be performed within a sidetone server 210, with which each of the local and remote user terminals 10 and 20 respectively communicate via the network. The advantage of such an arrangement is that each of the local and remote user terminals 10 and 20 can be simpler in design than within the previous embodiments, as they do not need those elements which are necessary to produce the sidetone images, and to generate the overlay combination images. Thus, referring to FIG. 4, within the eighth embodiment the user terminals 10 and 20 do without each of the image generator 464, image processor 468, as well as the software stored on the data storage unit 48, being the image overlay program 482, the remote image processing operation program 4810, and the sidetone image processing operation program 488. Of course, each user terminal will still possess a data storage unit 48, with a control program 484, and image data 486, so as to allow the user terminal to perform its standard operating functions and the like.

Figure 21:
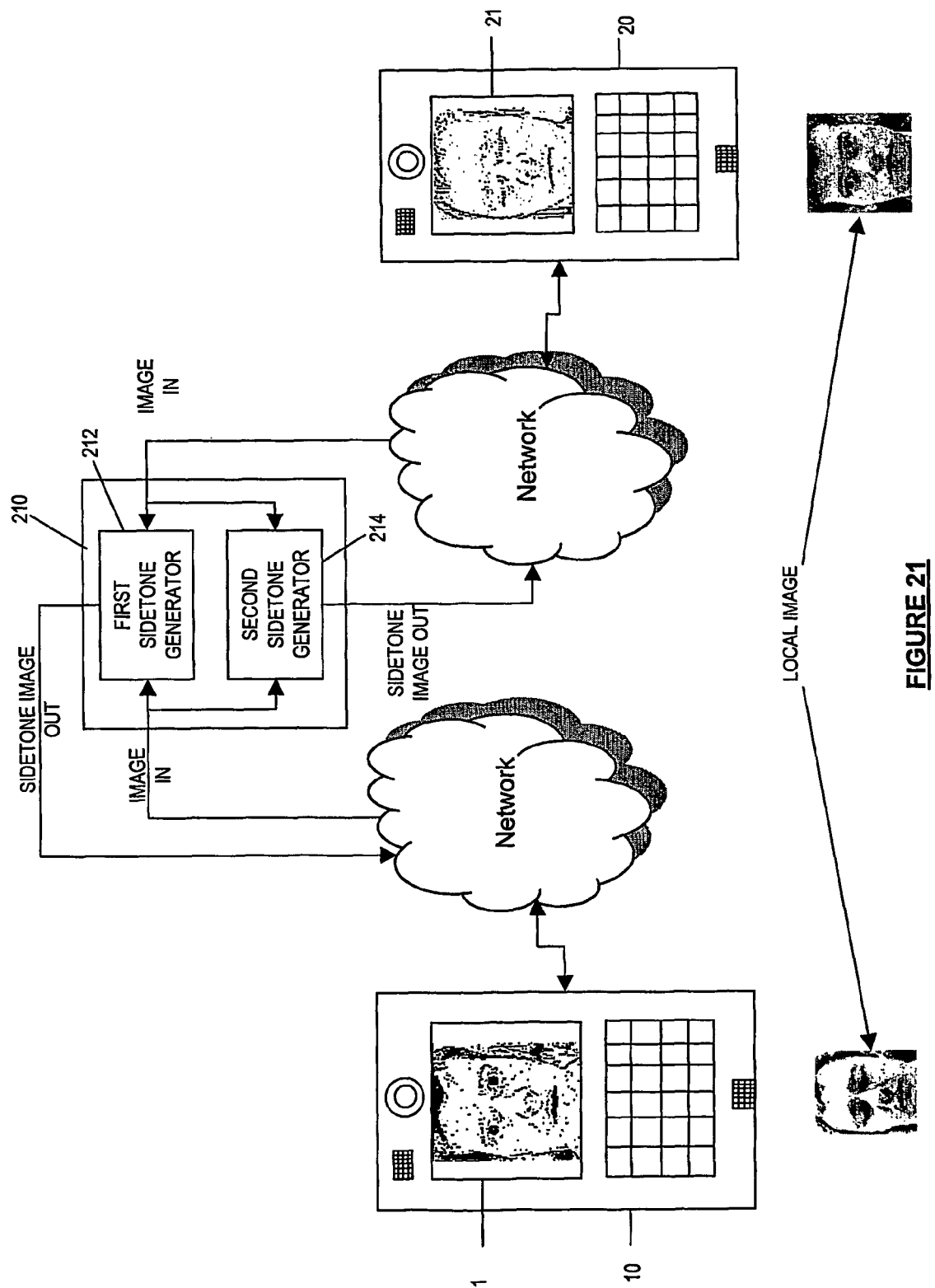
FIG. 21 is a stylistic representation of an eighth embodiment of the invention.

With the removal of the above elements from the user terminals, such elements are then placed within the sidetone server 210 (see FIG. 21). More particularly, with reference to FIG. 21, it will be seen that the sidetone server 210 contains a first sidetone generator 212, and a second sidetone generator 214. Each of the first and the second sidetone generator 212 and 214 receives as inputs the local image from the local user terminal 10, and the local image from the remote user terminal 20, which are each respectively transmitted from the local and remote user terminals 10 and 20 to the sidetone server 210 by respective network connections. The first sidetone generator 212 then acts to process the received input images accordingly, and combine the processed images to produce the overlay image, which is then output from the sidetone server 210 back over the network to the local user terminal 10. Similarly, the second sidetone generator 214 processes each of the received input images, accordingly, and combines the processed images to produce an overlay image which is then output from the sidetone server 210 via the network to the remote user terminal 20. Each of the local and remote user terminals 10 and 20 then display the images received from the sidetone server 210 to their respective users, on their respective displays.

With respect to the operations performed by the first and second sidetone generators 212 and 214, it should be appreciated from the above description that each of the sidetone generators performs image processing and generation operations identical to those which were performed by the image generator 464, and image processor 468 in the previously described embodiments. That is, each of the first and second sidetone generators 212 and 214 may each process their respective received images to produce sidetone images in accordance with any of the image processing operations of FIGS. 15, 16, or 17, as previously described, and may then combine the thus processed images to produce a combined overlay image for output according to any of the image generation techniques as previously described with respect to FIGS. 18, 19, or 20. In this respect, therefore, all of the functionality of the previous embodiments with respect to the various image processing operations that may be performed, and the various image combination operations to produce the final output image may be performed by the first and second sidetone generators 212 and 214 within the sidetone server 210, in a similar manner as provided by the previously described embodiments. Within the particular embodiment shown in FIG. 21, the first sidetone generator 212 acts to process the local image received from the local user terminal 10 in accordance with the image processing operation of FIG. 15, and processes the local image received from the remote user terminal 20 in accordance with the image processing operation of FIG. 16. The thus processed images are then combined in accordance with the image combination operation of FIG. 19, as previously described, and the thus resulting combination overlay image is output to the network for transmission to the local user terminal 10 and display thereby.

Concerning the second sidetone generator 214, this acts to process the local image received from the local user terminal 10 in accordance with the image processing of operation of FIG. 16 as previously described, and further acts to process the local image received from the remote user terminal 20 in accordance with the image operation of FIG. 15. The thus processed images are then combined to produce the overlay image for output, in the same manner as the first sidetone generator 212. The thus generated overlay image is then transmitted to the remote user terminal 20 via the network for display thereby.

Therefore, within the eighth embodiment the processing to produce the overlay images is performed within the sidetone server 210, thus allowing the user terminals 10 and 20 to be simpler in design and to perform less processing locally. Whilst within the specific embodiment of FIG. 21, we have shown the first sidetone generator 212 and the second sidetone generator 214 as performing the same image processing operations on the received respective images from the local and remote user terminals, in further embodiments based on the eighth embodiment this need not necessarily be the case, and different image processing operations may be performed out of the available image processing operations described. In this respect, each of the various combinations of image processing operations as are used in each of the first to seventh embodiments as previously described may also be obtained within variants of the eighth embodiment. In the implementation described above, the degree to which the local view appears "washed-out" may be constant. The opaque properties of the self-view are adjusted by parameters $\alpha$ and $\beta$, which may be set to be equal to one another.

An alternative implementation would adjust these parameters according to the "quality" of the local video, such that if the video were of poor quality the user would become aware of this as the self-view became more attention drawing (less opaque). The self-view would become more opaque, as the user adjusted the environment and improved the video. The video may be judged as poor, using a number of measures, for instance: contrast in lighting (either too bright or too dark) or absence of a face image. Contrast may be conventionally measured by taking the standard deviation of pixel luminance in the scene. Counting the number of "skin coloured" pixels in the view may indicate the absence of a face; alternatively more sophisticated methods are also well known. The impact this would have on the architecture of the system is shown in FIG. 22 and needs to be viewed in conjunction with FIG. 3 in the patent application.

Figure 22:
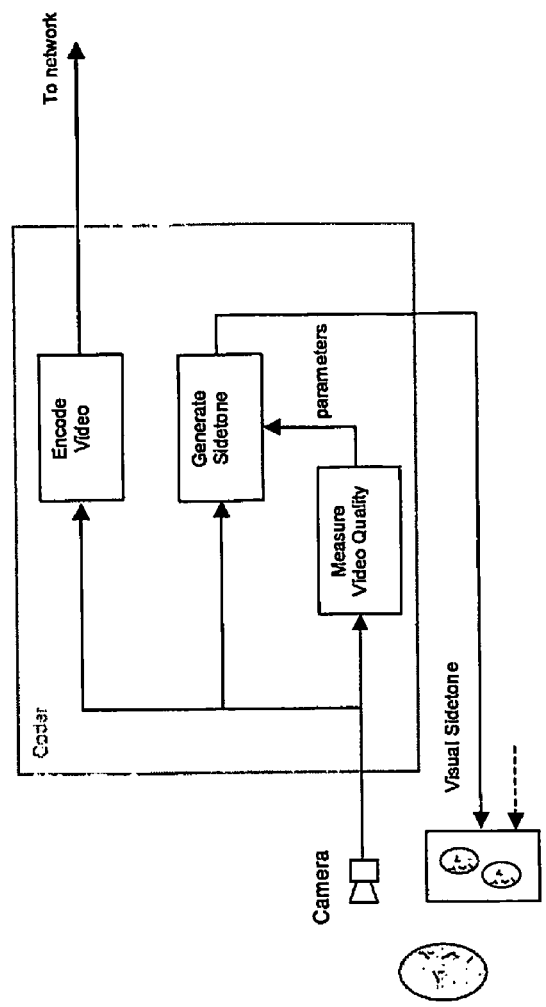
Figure 1:
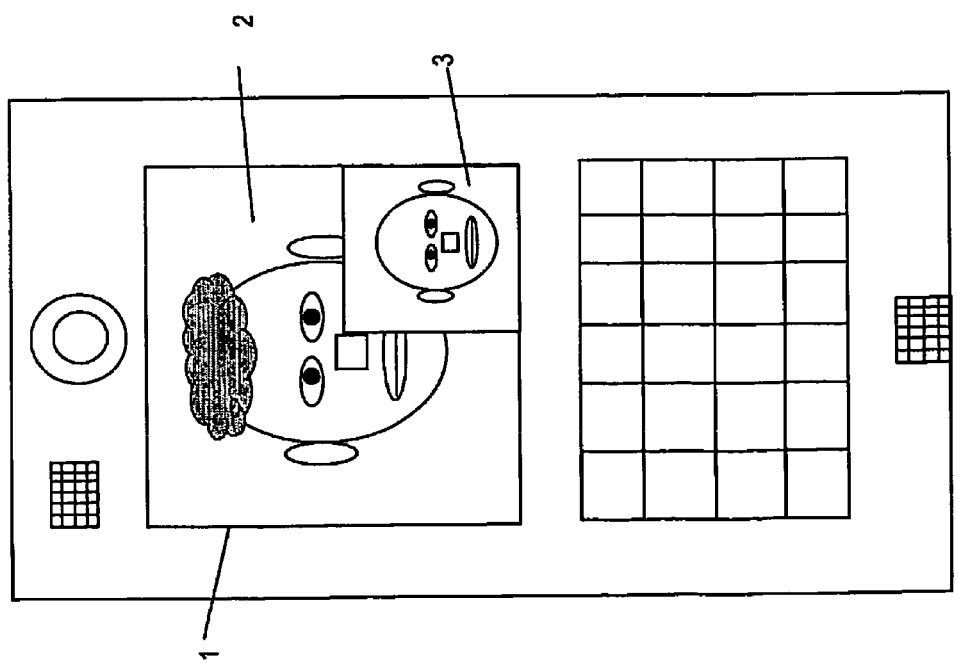
FIG. 1 gives a stylistic representation of a prior art video communications device.
Figure 2:
FIGS. 2(a) and (b) are screen shots from a prior art video communications system.
Figure 2:

Part of the video communication system shown in FIG. 22 (corresponding to the coder 32 of FIG. 3) includes measurement means in the form of, for example, a "measure video quality" stage for determining a measure of at least one characteristic of the quality of the images captured by the camera (i.e. the quality of the first video images). The measurement means will preferably be coupled to the "generate sidetone" stage or other image generating means, so that for example the degree to which the self view (that is, the sidetone or overlay image corresponding to the first video images) is opaque or transparent is dependent on the measured quality. These features thus provide a way of dynamically adjusting the visibility of the sidetone image.

Additionally, in yet further embodiments of the invention, an additional processing step may be applied to the sidetone image prior to it being combined with the remote image to produce the overlay image for output, in that it may be flipped along its vertical axis such that the image presents a mirror-image scene of the user, and hence gives the impression to the user that the sidetone is a mirror image of themselves. The remote image would not be so processed, however, such that text and the like could still be read within the remote image scene.

Moreover, although in the embodiments described above we describe the invention in the context of a two-party video communications, it should be understood that the invention is not so limited, and may be applied to multi-party video communications with three or more parties. For example, where three or more parties are present an embodiment similar to the seventh embodiment may be employed, with each of the images being processed according to the processes of FIGS. 16 or 17, and then a different colour wash being applied to those pixels of each image which are not white. The thus colour-washed images may then be overlaid in the manner described previously. By using a different colour for each participant the images of each participant should be discernible to the user in the output overlay image.

In view of the above description, it will be seen that the described embodiments provide a video communications system and associated method of operation thereof wherein video image representations of a local user may be processed, and overlaid with correspondingly processed video image representations of a remote user to produce an overlay image containing images of both users. The overlay image is arranged such that the representative image of the users faces are substantially in alignment, with the result that the resulting overlay image is usually of no greater size than either of the original input images. With regards to the processing which is performed on the images prior to the overlay operation, suitable image processing operations should be selected such that the resulting processed images are suitable to allow the features of each of the local and remote images to be discernable within the generated overlay images. Thus, for example, one of the image processing operations selected may be an operation which generates a high contrast black and white or grey scale image, over which can be overlaid a full colour image of the other user. Alternatively, however, another suitable image processing operations such as to increase the apparent opacity of an image, or to brighten the image and make it more susceptible for having a further image overlay thereon may be used. Smoothing operations may also be applied, as appropriate. Additionally, preferably the processing applied to the sidetone image is chosen such that it renders the sidetone image less visually attention grabbing than the remote image when displayed as the output overlay image to the user.

The invention provides the primary advantage that a sidetone image may be provided in a video communications apparatus provided with a screen which is otherwise not large enough to display two images without one image excluding the other. Whereas we have described embodiments which are mainly directly towards the use of the invention within mobile video communications apparatus, it should be understood that this is not exclusively the case, and that the invention may find application within any video communications device, such as computers, personal digital assistants, fixed line video telephones, or the like.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A video calling system comprising:
    a) a video camera arranged to produce local video images representative of a local video call participant;
    b) a transmitter arranged to receive said local video images and send information relating to said local video images to a remote receiver and a receiver arranged to receive information relating to remote video images representative of a remote participant in the video call via a communications link;
    c) a local video display arranged to display video images to said local video call participant; and
    d) an image generator arranged to receive said local video images and information relating to said remote video images, and generate combined video images for display on said local video display by combining said local and remote images such that both the face of the local participant and the face of the remote participant are:
        (i) displayed one on top of the other in substantial alignment; and
        (ii) simultaneously displayed in the region in which each one of the faces overlies the other face.

2. A system according to claim 1, and further comprising:
    an image processor arranged to process said local video images and/or said remote video images according to one or more respective image processing operations, and to output processed versions of the local and/or remote video images to the image generator as input thereto;
    wherein said image processing operations are operable to process said video images such that the respective participants of the local and remote video images are separably distinguishable in the combined image generated by the image generator.

3. A system according to claim 2, wherein one of the image processing operations comprises an image contrast enhancement operation.

4. A system according to claim 3 wherein the image contrast enhancement operation comprises detecting edges within the input image to produce an edge map, applying a threshold operation to the input image to produce a thresholded image, and combining the edge map with the thresholded image to produce the processed image.

5. A system according to claim 2, wherein one of the image processing operations comprises processing to render the processed image of increased opacity.

6. A system according to claim 2, wherein the remote video images are not processed by the image processor and the image generator operates to overlay the respective processed local video images onto the received remote video images.

7. A system according to claim 2, wherein the image processor is further operable to process the local video images twice to produce two processed versions of the local images; wherein a first processed version of each image is input to the image generator as input thereto, and a second processed version of each image is input to the transmitter for transmission thereby.

8. A system according to claim 7, wherein different image processing operations are applied to the local video images to produce the first processed versions and the second processed versions respectively.

9. A system according to claim 1, wherein the local image includes the local user's head, and/or the remote image includes a remote user's head.

10. A system according to claim 2, the system further comprising a quality measurer for determining a measure of at least one characteristic indicative of image quality for the local video images, the image generator being responsive to an indication of the measured quality, such that at least one visible characteristic of the combined images of the local video call participant is dependent on the image quality of the local video images.

11. A system according to claim 10, wherein the degree to which the combined images relating to the local video call participant are opaque is dependent on the image quality of the local video images.

12. A video calling system comprising:
a) a virtual reality unit arranged to produce virtual reality style images of a local video call participant;
b) a transmitter arranged to receive said virtual reality style images and to send information relating to said virtual reality style images to a remote receiver, and a receiver to receive information relating to remote video images representative of a participant in the video call via a communications link;
c) a local video display arranged to display video images to said local video call participant; and
d) an image generator arranged to receive said local video images and said information relating to remote video images and to generate combined video images for display on said local video display by combining the virtual reality style image of the local participant with the image of the remote participant such that both the face of the local participant and the face of the remote participant are:
(i) displayed one on top of the other in substantial alignment; and
(ii) simultaneously displayed in the region in which each one of the faces overlies the other face.

13. A video calling method comprising:
a) producing local video images representative of a local video call participant;
b) sending information relating to said local video images and receiving information relating to remote video images representative of a participant in the video call via a communications link;
c) displaying video images to said local video call participant; and
d) generating combined video images for display by combining the video image of the local participant with the video image of the remote participant such that both the face of the local participant and the face of the remote participant are:
(i) displayed one on top of the other in substantial alignment; and
(ii) simultaneously displayed in the region in which each one of the faces overlies the other face.

14. A method according to claim 13, and further comprising:
processing said local video images and/or said remote video images according to one or more respective image processing operations, and using processed versions of the local and/or remote video images to the generating step as input thereto;
wherein said image processing operations are operable to process said video images such that the respective participants of the local and remote video images are separably distinguishable in the combined image generated by the generating step.

15. A method according to claim 14, wherein one of the image processing operations comprises an image contrast enhancement operation.

16. A method according to claim 15 wherein the image contrast enhancement operation comprises detecting edges within the input image to produce an edge map, applying a threshold operation to the input image to produce a thresholded image, and combining the edge map with the thresholded image to produce the processed image.

17. A method according to claim 14, wherein one of the image processing operations comprises processing to render the processed image of increased opacity.

18. A method according to claim 14, wherein the remote video images are not processed by the image processing step, and the generating step operates to combine the respective processed local video images onto the received remote video images.

19. A method according to claim 14, wherein the image processing step further includes processing the local video images twice to produce two processed versions of the local images; wherein a first processed version of each image is used by the generation step as input thereto, and a second processed version of each image is sent to a remote terminal via the communication link.

20. A method according to claim 19, wherein different image processing operations are applied to the local video images to produce the first processed versions and the second processed versions respectively.

21. A method according to claim 13, wherein the local image includes the local participant's head, and/or the remote image includes a remote participant's head.

22. A non-transitory computer readable storage medium storing a computer program or any one or more of a suite of computer programs such that when executed by a computer or collectively by a plurality of computers it/they cause the computer or computers to perform the method of claim 13.

23. A method according to 13, including the further step of evaluating the quality of the local video images, wherein a visible characteristic of the local participant in the generated combined video images is chosen in dependence on the evaluated quality of the local video image.

24. A method according to claim 23, wherein the visible characteristic is the degree of transparency or visibility of the local participant in the combined image.

25. A video calling method comprising:
a) producing virtual reality style images representative of a local video call participant;
b) sending information relating to said virtual reality style images and receiving information relating to remote video images representative of a participant in the video call via a communications link;
c) displaying video images to said local video call participant; and
d) generating combined video images for display by combining the virtual reality style image of the local participant with the image of the remote participant such that both face of the local participant and the face of the remote participant are:
(i) displayed one on top of the other in substantial alignment; and
(ii) simultaneously displayed in the region in which each one of the faces overlies the other face.

26. A video calling system comprising:
a) a video camera arranged to produce local video images representative of a local video call participant;
b) a transmitter arranged to receive said local video images and send information relating to said local video images to a remote receiver and a receiver arranged to receive information relating to remote video images representative of a remote participant in the video call via a communications link;
c) a local video display arranged to display video images to said local video call participant;
d) an image generator arranged to receive said local video images and information relating to said remote video images, and generate combined video images for display on said local video display by combining said local and remote images such that the images of the participants appear to be overlaid one on top of the other in substantial alignment; and
e) an image processor arranged to process said local video images and/or said remote video images according to one or more respective image processing operations, and to output processed versions of the local and/or remote video images to the image generator as input thereto; wherein
said image processing operations are operable to process said video images such that the respective participants of the local and remote video images are separably distinguishable in the combined image generated by the image generator; and
the local video images are processed according to an image contrast enhancement operation, and the remote video images are processed to render the processed image of increased opacity; or
the remote video images are processed according to an image contrast enhancement operation, and the local video images are processed to render the processed image of increased opacity.

27. A video calling system comprising:
a) a video camera arranged to produce local video images representative of a local video call participant;
b) a transmitter arranged to receive said local video images and send information relating to said local video images to a remote receiver and a receiver arranged to receive information relating to remote video images representative of a remote participant in the video call via a communications link;
c) a local video display arranged to display video images to said local video call participant;
d) an image generator arranged to receive said local video images and information relating to said remote video images, and generate combined video images for display on said local video display by combining said local and remote images such that the images of the participants appear to be overlaid one on top of the other in substantial alignment; and
e) an image processor arranged to process said local video images and/or said remote video images according to one or more respective image processing operations, and to output processed versions of the local and/or remote video images to the image generator as input thereto; wherein
said image processing operations are operable to process said video images such that the respective participants of the local and remote video images are separably distinguishable in the combined image generated by the image generator;
the image processor is further operable to process the local video images twice to produce two processed versions of the local images; wherein a first processed version of each image is input to the image generator as input thereto, and a second processed version of each image is input to the transmitter for transmission thereby;
different image processing operations are applied to the local video images to produce the first processed versions and the second processed versions respectively;
the first processed versions of the local video images are produced by processing the local video images according to an image contrast enhancement operation, and the second processed versions of the local video images are produced by processing the local video images according to render the processed image of increased opacity; or
the second processed versions of the local video images are produced by processing the local video images according to an image contrast enhancement operation, and the first processed versions of the local video images are produced by processing the local video images to render the processed image of increased opacity.

28. A video calling method comprising:
a) producing local video images representative of a local video call participant;
b) sending information relating to said local video images and receiving information relating to remote video images representative of a participant in the video call via a communications link;
c) displaying video images to said local video call participant;
d) generating combined video images for display by combining the video image of the local participant with the video image of the remote participant such that the images of the participants appear to be overlaid one on top of the other in substantial alignment; and
e) processing said local video images and/or said remote video images according to one or more respective image processing operations, and using processed versions of the local and/or remote video images to the generating step as input thereto; wherein
said image processing operations are operable to process said video images such that the respective participants of the local and remote video images are separably distinguishable in the combined image generated by the generating step; and
the local video images are processed according to an image contrast enhancement operation, and the remote video images are processed to render the processed image of increased opacity; or
the remote video images are processed according to an image contrast enhancement operation, and the local video images are processed to render the processed image of increased opacity.

29. A video calling method comprising:
a) producing local video images representative of a local video call participant;

b) sending information relating to said local video images and receiving information relating to remote video images representative of a participant in the video call via a communications link;

c) displaying video images to said local video call participant;

d) generating combined video images for display by combining the video image of the local participant with the video image of the remote participant such that the images of the participants appear to be overlaid one on top of the other in substantial alignment; and e) processing said local video images and/or said remote video images according to one or more respective image processing operations, and using processed versions of the local and/or remote video images to the generating step as input thereto; wherein said image processing operations are operable to process said video images such that the respective participants of the local and remote video images are separably distinguishable in the combined image generated by the generating step;

the image processing step further includes processing the local video images twice to produce two processed versions of the local images; wherein a first processed version of each image is used by the generation step as input thereto, and a second processed version of each image is sent to a remote terminal via the communication link;

different image processing operations are applied to the local video images to produce the first processed versions and the second processed versions respectively; and the first processed versions of the local video images are produced by processing the local video images according to an image contrast enhancement operation, and the second processed versions of the local video images are produced by processing the local video images to render the processed image of increased opacity; or the second processed versions of the local video images are produced by processing the local video images according to an image contrast enhancement operation, and the first processed versions of the local video images are produced by processing the local video images to render the processed image of increased opacity.

* * * * *